(12) United States Patent
Bhatnagar

(10) Patent No.: US 11,410,638 B1
(45) Date of Patent: Aug. 9, 2022

(54) VOICE USER INTERFACE FOR NESTED CONTENT

(71) Applicant: Amazon Technologies, Inc., Seattle, WA (US)

(72) Inventor: Eshan Bhatnagar, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 312 days.

(21) Appl. No.: 15/690,810

(22) Filed: Aug. 30, 2017

(51) Int. Cl.
| | |
|---|---|
| *G10L 13/00* | (2006.01) |
| *G10L 15/22* | (2006.01) |
| *G10L 13/08* | (2013.01) |
| *G06F 3/16* | (2006.01) |
| *G10L 13/047* | (2013.01) |
| *G09B 19/00* | (2006.01) |
| *G09B 5/04* | (2006.01) |
| *G10L 13/027* | (2013.01) |
| *G10L 15/18* | (2013.01) |

(52) U.S. Cl.
CPC .............. *G10L 13/08* (2013.01); *G06F 3/167* (2013.01); *G09B 5/04* (2013.01); *G09B 19/0092* (2013.01); *G10L 13/00* (2013.01); *G10L 13/047* (2013.01); *G10L 15/22* (2013.01); *G10L 13/027* (2013.01); *G10L 15/1822* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 8,145,854 | B1 * | 3/2012 | Lee | G06Q 10/06316 |
| | | | | 711/154 |
| 9,316,400 | B2 * | 4/2016 | Nishikawa | F24C 7/08 |
| 9,477,777 | B2 * | 10/2016 | Stankiewicz | G06F 16/355 |
| 9,797,873 | B1 * | 10/2017 | Feller | G16H 20/60 |
| 10,102,855 | B1 * | 10/2018 | Sindhwani | G10L 15/22 |
| 10,469,283 | B1 * | 11/2019 | Kinney | G08B 21/00 |
| 11,093,537 | B2 * | 8/2021 | Endo | G06F 16/735 |
| 11,258,626 | B2 * | 2/2022 | Tanaka | H04L 12/2823 |
| 2014/0172953 | A1 * | 6/2014 | Blanksteen | H04W 4/02 |
| | | | | 709/203 |
| 2016/0081515 | A1 * | 3/2016 | Aboujassoum | A47J 36/00 |
| | | | | 426/231 |
| 2016/0162179 | A1 * | 6/2016 | Annett | G06F 3/0488 |
| | | | | 715/709 |
| 2016/0203233 | A1 * | 7/2016 | Akselrod | G06F 16/986 |
| | | | | 715/234 |
| 2017/0323640 | A1 * | 11/2017 | Sisodia | G06Q 30/06 |
| 2018/0121848 | A1 * | 5/2018 | Kito | G06F 3/0482 |
| 2018/0232202 | A1 * | 8/2018 | Tagawa | G06F 3/167 |
| 2018/0357309 | A1 * | 12/2018 | Eidem | H04L 9/3236 |
| 2019/0034542 | A1 * | 1/2019 | Ming | G06F 16/9535 |

* cited by examiner

Primary Examiner — Richard Z Zhu
(74) Attorney, Agent, or Firm — Pierce Atwood LLP

(57) ABSTRACT

Methods and systems for causing a voice-activated electronic device to identify that a step of a series of steps can begin while a previous step is ongoing. In some embodiments, a first step will have a waiting period. The methods and systems, in some embodiments, identify this waiting period and determine that a second step can begin during the waiting period of step one. In some embodiments, nested sets of sequential steps are identified within the series of steps. The nested sets of sequential steps, in some embodiments, can be called upon.

16 Claims, 6 Drawing Sheets

VOICE USER INTERFACE FOR NESTED CONTENT

BACKGROUND

Some electronic devices assist people with cooking by giving step-by-step instructions of a cooking recipe. In many cases cooking recipes include multiple dishes, courses, or child recipes. Sometimes people want to prepare a specific dish, course, or child recipe when preparing a full cooking recipe. Some electronic devices are capable of identifying and generating a specific dish, course, or child recipe within a cooking recipe.

DETAILED DESCRIPTION

Figure 1A:
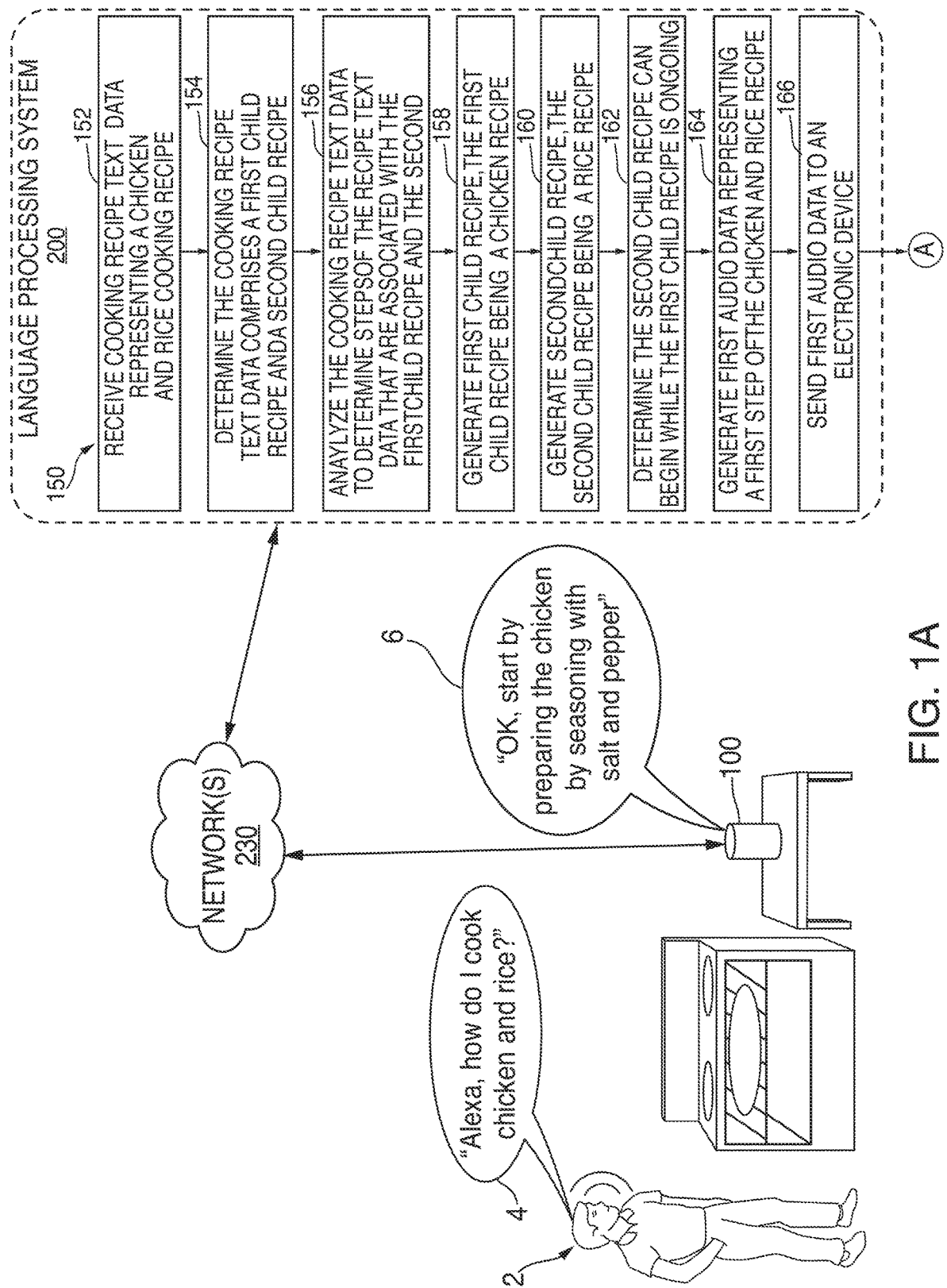
FIG. 1A is an illustrative diagram of an exemplary system where a voice-controlled electronic device receives a request to provide instructions regarding preparing a cooking recipe in accordance with various embodiments.

The present disclosure, as set forth below, is generally directed to various embodiments of systems and methods that identify and provide nested child recipes of cooking recipes. In particular, a cooking recipe may have one or more nested recipes that are identified and presented to a user upon a request. In some embodiments, an electronic device may receive an utterance from a user. This utterance may contain a wakeword followed by a request to receive step-by-step instructions to prepare a cooking recipe. For example, the user may state "Alexa, cook spaghetti and meatballs." As another example, the user may state "Alex, cook Peruvian style chicken." As used herein, the term "cooking recipe" may correspond to any set of instructions that may lead to someone preparing food for eating. In response, to detecting a wakeword, the electronic device may send audio data representing the utterance to a language processing system. The language processing system may analyze the audio data and determine that the user is requesting step-by-step instructions on how to cook a recipe. In response, in some embodiments, the language processing system may cause a voice activated electronic device to initialize a cooking mode. A cooking mode may be a function of a skill or application that allows a user to interact with the electronic device specifically for the purposes of cooking. Once in a cooking mode, the language processing system may receive recipe text data representing the requested cooking recipe. For example, the language processing system may receive text data representing a recipe for spaghetti and meatballs. As another example, the language processing system may receive text data representing a recipe for Peruvian style chicken.

After receiving the recipe text data, the language processing system may analyze the recipe text data to determine if there are child recipes present within the recipe text data. A "child recipe," as used herein may refer to any dish, course, or part of the recipe that on its own, requires a list of instructions. For example, a recipe for spaghetti and meatballs may have two child recipes. A first child recipe for cooking the spaghetti and a second child recipe for cooking the meatballs. As another example, a recipe for Peruvian style chicken may have two child recipes. A first child recipe for the chicken and a second child recipe for the sauce that goes on the chicken.

In some embodiments, the language processing system may analyze the name of the recipe. For example, the language processing system may analyze the name "Spaghetti and Meatballs" and determine there are two child recipes. This conclusion may be based off of the language processing system determining that there are two words in the name. In some embodiments, these words may be nouns. The first noun, being "spaghetti" and the second noun being "meatballs." After determining there are two nouns, the language processing system may determine that each of the two nouns corresponds to a food that, in itself, could be a recipe. This may be accomplished by comparing the noun recipes stored on the language processing system. For example, the language processing system may compare "spaghetti" to stored recipes and determine that the term "spaghetti" is the focus of, or is pan of, recipes that are stored with the language processing system. As used herein, the term "name" as it relates to recipe may refer to any title or any manner of categorizing the cooking recipe.

Once it has been determined that there are child recipes nested within the recipe text data representing the requested recipe, the language processing system may analyze each step of the requested recipe to determine which steps are associated with which child recipe. The language processing system may analyze each step by comparing the identified noun from the name of the recipe to the steps within the recipe. For example, if the requested recipe is spaghetti and meatballs, every step associated with cooking the spaghetti would be associated with the spaghetti child recipe and every step associated with cooking the meatballs would be associated with the meatball child recipe. Thus, a step stating "prepare the meatballs by putting salt and pepper on the ground beef," would be associated with the meatball child recipe.

After identifying which steps are associated with which child recipes, the language processing system may generate the child recipes that can be requested for when preparing the cooking recipe. The language processing system may take each step that is associated with a child recipe and populate a child recipe. For example, if the requested recipe is spaghetti and meatballs, every step associated with spaghetti would populate a spaghetti child recipe. In some instances the language processing system may provide a framework for the child recipes, allowing each recipe to be output in a linear order while allowing the user to request child recipe specific instructions. For example, a recipe for spaghetti and meatballs may start with "fill a medium sized pot with salted water." After hearing that instruction, a user may request, "Alexa, how do I make the meatballs." The language processing system may analyze a digital representation of the user's request and determine that the user is making a request to receive instructions on how to cook the meatball child recipe. In response, the language processing system may generate audio data based on the text data representing the meatball child recipe. The generated audio data may then be output to the electronic device which may in turn output the audio data. For example, the electronic device may output "To make the meatballs, start by seasoning the ground beef with salt and pepper."

In some embodiments, a recipe may include a waiting period. A waiting period, in some embodiments may be time where a step of the recipe calls for a period of time where the food needs to cook or rest. For example, a step of a cooking recipe may be "To cook the spaghetti, put the spaghetti in boiling water for 12 minutes." The waiting period for the aforementioned exemplary step would be 12 minutes. In embodiments where a waiting period is present, the language processing system may determine that another step, or, in some embodiments, another child recipe, may be completed during the wait time. The language processing system may make this determination by first analyzing the recipe text data to determine that a future step or another child recipe does not require the current step to complete. Continuing the example, the language processing system may determine that the meatball child recipe does not require the spaghetti to be finished. Next, the language processing system may determine that the step "To cook the spaghetti, put the spaghetti in boiling water for 12 minutes," includes waiting period text data that represents awaiting period—"12 minutes." In some embodiments, after finding the waiting period text data, the language processing system may analyze the amount of waiting time to determine whether another step, or another child recipe, can be started or completed during the amount of wait time. For example, "12 minutes" may be long enough to start preparing and cooking the meatball child recipe. As another example, "30 seconds" may not be enough time to start preparing and cooking the meatball child recipe. If there is enough time, the language processing system may determine that another step, or another child recipe, will begin while the current step is being completed. If there is not enough time, the language processing system may determine that the current step must be completed before another step, or another child recipe, is started.

If the language processing system determines that another step, or another child recipe, will begin as the current step is ongoing, the language processing system may retrieve audio data representing a prompt. This prompt may indicate that another step of the cooking recipe, or another child recipe within the cooking recipe, may begin while the current step is finishing. Continuing the example, after the language processing system sends audio data representing the step "To cook the spaghetti, put the spaghetti in boiling water for 12 minutes," the language processing system may retrieve audio data representing a prompt that states "While you are waiting for the spaghetti to finish, would you like to start cooking the meatballs?" In some embodiments, this prompt may be sent to a voice-controlled electronic device causing one or more speakers of the voice-controlled electronic device to output the prompt. In some embodiments, the prompt may be sent along with listening instructions that cause the voice-controlled electronic device to listen, using one or more microphones of the voice-controlled electronic device, for a response. The listening instructions may allow an individual to respond to the prompt without the use of the wakeword. If the response to the prompt is a positive response (i.e. yes, OK, sure, etc.), the language processing system may generate audio data representing the first step of the meatball child recipe and send the audio data to the voice-controlled electronic device. If the response is a negative response (i.e. No, negative, later, etc.), the language processing system may wait for audio data representing an utterance requesting the language processing system to continue the recipe.

In some embodiments, once the child recipe is completed, the language processing system may return to the original step of the cooking recipe that was last output. For example, if the recipe for spaghetti and meatballs left off with "fill a medium sized pot with salted water," after completing the meatball child recipe, the language processing system may output the next step "boil the salted water." In some embodiments, the language processing system may generate text data representing a prompt asking a user whether the user would like to return to the original step, or start a second child recipe. For example the prompt may state, "would you like to return to the spaghetti?"

In some embodiments, after identifying child recipes within the name of the recipe, the language processing system may determine an additional child recipe is nested within the recipe text data. For example, the language processing system, while analyzing the steps to determine which steps are associated with which child recipe, may determine that a series of steps is not associated with either child recipe. For example, a third child recipe within a spaghetti and meatballs recipe may be the sauce for the spaghetti and meatballs. The language processing system, upon determining another child recipe exists, may generate a third child recipe—a sauce child recipe.

In some embodiments, the language processing system may determine the name of the recipe does not indicate whether a child recipe is present within the recipe text data. For example, the language processing system may analyze the name "Peruvian style chicken" and determine only one noun is present "chicken." This may not indicate whether there are child recipes nested in the "Peruvian style chicken" recipe text data. The language processing system may analyze each step to determine whether there are child recipes nested within the recipe text data. In some embodiments, the language processing system may analyze each step to determine whether there is a noun present that indicates a child recipe. For example, the first step of the "Peruvian style chicken" may be "prepare the sauce by mixing lime and garlic." The noun sauce, in some embodiments may indicate a "sauce" child recipe. After determining there are child recipes within the recipe text data, the language processing system may generate child recipes in a similar manner as discussed above.

In some embodiments, recipe text data representing the cooking recipe may include text data representing a list of ingredients. In these embodiments, the language processing system may analyze the text data representing the list of ingredients in order to associate each ingredient with a child recipe. The language processing system may determine which ingredient is associated with which child recipe by comparing the steps of the recipe to the list of ingredients. If an ingredient is present in a step of a child recipe, that ingredient may be associated with that child recipe. For example, ground beef may be associated with a meatball child recipe. As another example, linguini may be associated with the spaghetti child recipe. In some embodiments, ingredients may be associated with multiple child recipes. For example, a recipe for spaghetti and meatballs may require 2 cloves of garlic. One clove of garlic may be used for the spaghetti, and one clove of garlic may be used for the meatballs. In these embodiments, the language processing system may flag the ingredient as associated with multiple child recipes.

In some embodiments, multiple recipes may be called upon at once. For example, the language processing system may receive audio data representing a request to make chicken and Caesar salad. While there may not be a single recipe that includes chicken and Caesar salad, the language processing system may provide a recipe of chicken and a recipe for Caesar salad. In some embodiments, language processing system may provide instructions in a linear manner (i.e. either the chicken recipe first and then the Caesar salad recipe, or the Caesar salad recipe first and then the chicken recipe). In some embodiments, the language processing system may treat the two recipes as child recipes of the requested chicken and Caesar salad recipe.

While the present disclosure uses cooking as a main example, the principles of the present invention may be applied to any multi-step process. For example, building a piece of furniture may have multiple child processes that can be done individually. As another example, while decorating a living room, there may be significant wait time for paint on a wall to dry. While paint is drying, other steps within the process of decorating a living room may be completed. The above two examples are non-limiting and merely for exemplary purposes and the principles of the present invention may be applied to any multi-step process.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however any word (e.g., "Amazon"), or series of words (e.g., "Wake Up" or "Hello, Alexa") may alternatively be used as the wakeword. Furthermore, the wakeword may be set or programmed by an individual operating a voice-controlled electronic device, and in some embodiments more than one wakeword (e.g., two or more different wakewords) may be available to activate a voice-controlled electronic device. In yet another embodiment, the trigger that is used to activate a voice activated device may be any series of temporally related sounds.

As used herein, the term "utterance" may correspond to a spoken word, statement, or sound. In some embodiments, an utterance may include the wakeword followed by an invocation, such as a request, question, or command. In this particular instance, the utterance may begin with the wakeword being spoken, and may end when a last word, phoneme, or sound is spoken. For example, an utterance may correspond to the question, "Alexa—What is the weather currently like?" As another example, an utterance may be, "Alexa—Play my workout music," or "Alexa—Buy that." Further still, an utterance, which need not include the wakeword, may be, "Turn up the volume" or "Call mom."

Another type of sound controlled electronic device may be a sound activated electronic device. Such sound activated electronic device may function similarly to voice-controlled electronic devices, except that, for sound activated electronic devices, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice-controlled electronic device. For example, the sound of a door opening, when detected, may activate a sound activated electronic device, which in turn may activate a burglar alarm.

In some embodiments, the electronic device may additionally, or alternatively, correspond to a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk device is one type of manually activated device. Such tap-to-talk devices, for instance, are capable of obtaining and outputting audio data in response to a button being pressed by an individual. In some embodiments, a sound controlled electronic device (e.g., a voice-controlled electronic device and/or a sound activated electronic device) may include manual activated functionality such that an individual may interact with the device using voice (e.g., speech prefaced by a wakeword), sound (e.g., a particular trigger sound), and/or a manual input (e.g., a button press, a touch of a screen, etc.). However, in some embodiments, an electronic device may be configured to include a single activation functionality (e.g., only voice activated, or only manually activated).

FIG. 1A is an illustrative diagram of an exemplary system where voice-controlled electronic device 100 receives a request to provide instructions regarding preparing a cooking recipe in accordance with various embodiments. In a non-limiting embodiment, individual 2 may speak first utterance 4 to their voice-controlled electronic device 100. For example, individual 2 may speak first utterance 4, "Alexa, how do I cook chicken and rice?" In response to detecting a wakeword "Alexa," voice-controlled electronic device 100 may begin packing and sending audio data representing first utterance 4 to language processing system 200 over network(s) 230. A more detailed description of voice-controlled electronic device 100, language processing system 200, and network(s) 230 are located below in connection with FIG. 2 and the same descriptions apply herein.

In some embodiments, after receiving audio data from portable electronic device 100, language processing system 200 will determine that individual 2 attempting to use a cooking functionality of voice-controlled electronic device 100. A functionality may be similar to functionalities 262 described in connection with FIG. 2, and the same description applies here. In some embodiments, in response to first utterance 4, language processing system 200 may access a cooking functionality, which may cause language processing system 200 to send instructions to voice-controlled electronic device 100 to start a cooking mode. While voice-controlled electronic device 100 is in a cooking mode, language processing system 200 may have cooking specific options for individual 2. Language processing system 200 may generate and output audio to voice-controlled electronic device 100, the audio representing the statement "Ok, would you like to cook, review a recipe, or search recipes?" Language processing system 200 may also output instructions to voice-controlled electronic device 100 which may cause voice-controlled electronic device 100 to listen for a response. In this example, because of the received after voice-controlled electronic device 100 outputs the statement "Ok, would you like to cook, review a recipe, or search recipes?" individual 2 would not have to use a wakeword with its response because of the instructions output by language processing system 200.

In some embodiments, in response to first utterance 4, language processing system 200 may perform process 150. Process 150 may begin at step 152. At step 152, the language processing system receives cooking recipe text data representing a chicken and rice cooking recipe. In some embodiments, language processing system 200 will access stored cooking recipes associated with a user account of individual 2. Stored cooking recipes may be located in storage/memory 254 of user accounts 268. In some embodiments, the cooking recipe text data from storage associated with a cooking functionality. In some embodiments, the cooking recipe text data may include a name of the cooking recipe and step-by-step instructions on how to cook the cooking recipe. For a more detailed description of a name of a cooking recipe, see the description of name 402 described below in connection with FIG. 4, the same description applying herein. A name of a recipe, for example, may be "chicken and rice." Step-by-step instructions, for example, may be the steps on how to prepare the cooking recipe chicken and rice. For example, the step-by-step instructions may be as follows:

"Step 1: Prepare the chicken by seasoning with salt and pepper;"

"Step 2: To cook the chicken, first heat two teaspoons of olive oil on a medium pan until hot;"

"Step 3: To cook the rice, combine one cup of rice with one cup of water in a medium pot and heat to boiling;"

"Step 4: Once the olive oil has been heated up, cook the chicken on the medium pan for five minutes on each side;" and "Step 5: Once the water is boiling, turn the heat to low and cover the pot for 12 minutes."

In some embodiments, process 150 may continue with step 154. At step 154, language processing system 200 determines the recipe text data comprises a first child recipe and a second child recipe. In some embodiments, language processing system 200 may determine that child recipes are present within the recipe text data by first analyzing the name of the recipe to see if the name indicates that child recipes are present. Language processing system 200 may analyze the name to determine if there are any nouns within the name that may represent a child recipe. For example, "chicken," "rice," "steak," "salad," and "sauce" are all nouns that may indicate a child recipe is present within the recipe text data. This non-exhaustive list is merely exemplary. Language processing system 200 may determine a noun represents a potential child recipe by comparing the noun to stored cooking recipes. For example, if the noun is "salad," language processing system 200 may compare "salad" to a list of stored cooking recipes. In some embodiments, language processing system 200 may determine that "salad" has at least one cooking recipe, and thus is likely a child recipe. As another example, the name "chicken and rice" may indicate to language processing system 200 that the recipe text data has two child recipes—a first child recipe for chicken and a second child recipe for rice. Making "chicken" the first child recipe and "rice" the second child recipe instead of "rice" the first child recipe and "chicken" the second child recipe may be completely arbitrary. This analysis may be similar to the analysis in process 300 described below in connection with FIG. 3, the same description applying herein.

In some embodiments, the name of the cooking recipe may not indicate whether a child recipe is present in the cooking recipe. In those embodiments, language processing system may analyze each step in the step-by-step instructions of the cooking recipe text data to determine if there is a child recipe present within the cooking recipe text data. A more detailed description of this process is located in process 300 described below in connection with FIG. 3, the same description applying herein.

In some embodiments, process 150 may continue at step 156. At step 156, language processing system 200 analyzes the cooking recipe text data to determine steps of the recipe text data that are associated with the first child recipe and the second child recipe. After determining that child recipes are present in the cooking recipe text data, language processing system 200 may analyze each step within the cooking recipe text data to determine which steps are associated with which child recipe. In some embodiments, language processing system 200 may start by comparing the noun that represents the first child recipe to all of the steps. For example, returning to the exemplary steps for chicken and rice provided above, language processing system 200 may start by comparing "chicken" to "Step 1: Prepare the chicken by seasoning with salt and pepper." Language processing system 200 may determine that the first step of the chicken and rice recipe is associated with "chicken" and therefore the first child recipe. Language processing system 200 may continue analyzing each step, finding, for example, that steps 1, 2, and 4 of the chicken and rice recipe are associated with "chicken" and the first child recipe.

In some embodiments, language processing system 200 may continue by analyzing each step of the cooking recipe text data to determine whether "rice" and therefore the second child recipe is associated with any of the steps. Language processing system 200 may start with analyzing "Step 1: Prepare the chicken by seasoning with salt and pepper," to determine whether the first step of the chicken and rice recipe is associated with "rice." In this example, language processing system 200 may determine that step 1 is not associated with "rice." This analysis of step 2 of the chicken and rice recipe may be similar in that language processing system may determine that the step 2 of the chicken and rice recipe is not associated with the second child recipe. Continuing the analysis, language processing system 200 may compare "rice" to "Step 3: To cook the rice, combine one cup of rice with one cup of water in a medium pot and heat to boiling." Because the noun "rice" is present in step 3 of the chicken and rice recipe, language processing system 200 may determine that step 3 of the chicken and rice recipe is associated with the second child recipe.

Language processing system 200 may continue analyzing the cooking recipe text data by comparing "rice" to "Step 5: Once the water is boiling, turn the heat to low and cover the pot for 12 minutes." Although "rice" is not in step 5 of the chicken and rice recipe, language processing system 200 may determine that step 5 is associated with the second child recipe. This may be accomplished by comparing step 5 of the chicken and rice recipe to a step that is already associated with the second child recipe, step 3. Language processing system 200 may determine that boiling water may be associated with heating to boiling of step 3. This association may lead language processing system 200 to associate step 5 with the second child recipe.

In some embodiments, the comparisons of the first noun to all of the steps of the cooking recipe and the second noun to all of the steps of the cooking recipe may happen simultaneously. In some embodiments, this analysis may also include adjectives with nouns in order to separate closely related child recipes. For example, if the cooking recipe text data includes two types of chicken, "roasted chicken" and "grilled chicken," language processing system 200 may analyze the steps of the cooking recipe text data for "roasted chicken" and "grilled chicken" instead of only using the noun "chicken." The use of chicken and rice in FIGS. 1A and 11 is merely exemplary, and any cooking recipe may be used. Moreover, in some embodiments, the steps within process 150 in FIGS. 1A and 1B may be rearranged or omitted.

Process 150 may continue at step 158. At step 158 language processing system 200 may generate the first child recipe, the first child recipe being a chicken recipe. After determining which steps of the cooking recipe are associated with the first child recipe, language processing system 200 may generate the first child recipe by generating first child recipe text data, the first child recipe text data being every step of the cooking recipe identified as being associated with the first child recipe. For example, returning to the exemplary steps for chicken and rice provided above, language processing system 200 may generate the following first child recipe:

"Prepare the chicken by seasoning with salt and pepper;"

"To cook the chicken, first heat two teaspoons of olive oil on a medium pan until hot; and"

"Once the olive oil has been heated up, cook the chicken on the medium pan for five minutes on each side."

In some embodiments, a first child name may be generated as well. For example, the first child recipe may have a name of "Chicken recipe." In some embodiments, language processing system 200 may populate the first child recipe text data by copying the relevant text data from the cooking recipe text data. In some embodiments, language processing system 200 may receive the relevant text data from functionalities 262. In some embodiments, language processing system may receive the relevant text data from storage/memory 254 of user accounts 268. In some embodiments, language processing system 200 may flag the text data representing each step of the recipe. This flag may indicate which step is associated with which child recipe.

Process 150 may continue at step 160. At step 160 language processing system 200 may generate the second child recipe, the second child recipe being a rice recipe. After determining which steps of the cooking recipe are associated with the second child recipe, language processing system 200 may generate the second child recipe by generating second child recipe text data, the second child recipe text data being every step of the cooking recipe identified as being associated with the second child recipe. For example, returning to the exemplary steps for chicken and rice provided above, language processing system 200 may generate the following second child recipe:

"To cook the rice, combine one cup of rice with one cup of water in a medium pot and heat to boiling;" and "Once the water is boiling, turn the heat to low and cover the pot for 12 minutes."

In some embodiments, a second child name may be generated as well. For example, the second child recipe may have a name of "Rice recipe." In some embodiments, language processing system 200 may populate the second child recipe text data by copying the relevant text data from the cooking recipe text data. In some embodiments, language processing system 200 may receive the relevant text data from functionalities 262. In some embodiments, language processing system may receive the relevant text data from storage/memory 254 of user accounts 268.

Process 150 may continue at step 162. At step 162, language processing system 200 may determine the second child recipe can begin while the first child recipe is ongoing. In some embodiments, a recipe may include a waiting period. A waiting period, in some embodiments may be time where a step of the recipe calls for a period of time where the food needs to cook or rest. For example, while the olive oil is heating up on a medium pan, the step "To cook the rice, combine one cup of rice with one cup of water in a medium pot and heat to boiling," may be completed. As another example, a step of a cooking recipe may be "To cook the steak, put the steak on the grill for 5 minutes per side." The waiting period for the aforementioned exemplary step would be 12 minutes. In embodiments where a waiting period is present, language processing system 200 may determine that another step, or, in some embodiments, another child recipe, may be completed during the wait time. Language processing system 200 may make this determination by first analyzing the recipe text data to determine that a future step or another child recipe does not require the current step to complete. Continuing the example, language processing system 200 may determine that a mashed potatoes recipe does not require the steak to be finished. Next, language processing system 200 may determine that the step "To cook the steak, put the steak on the grill for 5 minutes per side," includes waiting period text data that represents a waiting period—"5 minutes." In some embodiments, language processing system 200 may determine the "per side" text means that the waiting period will double, making the waiting period "10 minutes." In some embodiments, after finding the waiting period text data, language processing system 200 may analyze the amount of waiting time to determine whether another step, or another child recipe, can be started or completed during the amount of wait time. For example, "5 minutes" or "10 minutes" may be long enough to start preparing and cooking a mashed potatoes child recipe. As another example, "45 seconds" may not be enough time to start preparing and cooking a mashed potatoes child recipe. If there is enough time, language processing system 200 may determine that another step, or another child recipe, will begin while the current step is being completed. If there is not enough time, language processing system 200 may determine that the current step must be completed before another step, or another child recipe, is started.

If language processing system determines 200 that another step, or another child recipe, will begin as the current step is ongoing, language processing system 200 may retrieve audio data representing a prompt. This prompt may indicate that another step of the cooking recipe, or another child recipe within the cooking recipe, may begin while the current step is finishing. Continuing the example, after the language processing system sends audio data representing the step "To cook the steak, put the steak on the grill for 5 minutes per side," language processing system 200 may retrieve audio data representing a prompt that states "While you are waiting for the steak to finish, would you like to start cooking the mashed potatoes?" In some embodiments, this prompt may be sent voice-controlled electronic device 100 via network(s) 230 causing one or more speakers of voice-controlled electronic device 100 to output the prompt. In some embodiments, the audio data representing the prompt may be sent along with listening instructions that cause voice-controlled electronic 100 device to listen, using one or more microphones of voice-controlled electronic device 100, for a response. The listening instructions may allow individual 2 to respond to the prompt without the use of a wakeword. If the response to the prompt is a positive response (i.e. yes, OK, sure, etc.), language processing system 200 may generate audio data representing the first step of the mashed potatoes child recipe and send the audio data to voice-controlled electronic device 100. If the response is a negative response (i.e. No, negative, later, etc.), language processing system 200 may wait for audio data representing an utterance requesting language processing system 200 to continue the recipe.

Process 150 may continue at step 164. At step 164, language processing system 200 may generate first audio data representing a first step of the chicken and rice recipe.

After generating the first child recipe and the second child recipe, language processing system 200 may start the cooking recipe at step 1. In some embodiments, the first audio data may be generated by executing text-to-speech functionality on the text data representing the first step of the cooking recipe—generating audio data representing the first step of the cooking recipe. For example, text-to-speech functionality may be executed on text data representing "Step 1: Prepare the chicken by seasoning with salt and pepper." In some embodiments, text-to-speech may be executed by using text-to-speech 264 described below in connection with FIG. 2, and the same description applies herein. In some embodiments, language processing system 200 may generate additional audio data to make the audio output more conversational. For example, in order to give a response that sounds more conversational, language processing system may add the words "Ok, start by" For a more detailed description on the functionalities of language processing system 200, see the description of language processing system 200 below in connection with FIG. 2.

Process 150 may continue at step 166. At step 166, language processing system 200 may send the first audio data to an electronic device. In some embodiments, language processing system 200 may send the first audio data to voice-controlled electronic device 100 causing voice-controlled electronic device 100 to output first response 6, "Ok, start by preparing the chicken by seasoning with salt and pepper." Voice-controlled electronic device 100 may output the first audio data using speaker(s) 210—which is described below in connection with FIG. 2. In some embodiments, language processing system 200 may generate additional audio data, letting individual 2 know that voice-controlled electronic device 100 is listening for a prompt to start the next step. For example, language processing system 200 may generate and output audio data representing the following statement "to continue to the next step of the chicken and rice recipe, just say next." In those embodiments, voice-controlled electronic device may listen for a response for a predetermined amount of time. For example, voice-controlled electronic device 100 may listen for one minute, waiting for individual 2 to say next. If, within that minute, individual 2 states "next," language processing system may repeat steps 162 and 164 on a second step of the cooking recipe. If individual 4 does not respond within that window, voice-controlled electronic device 100 may stop listening, which, in some embodiments, may require individual 2 to state a wakeword in order to get voice-controlled electronic device to send audio data to language processing system 200.

Figure 1B:
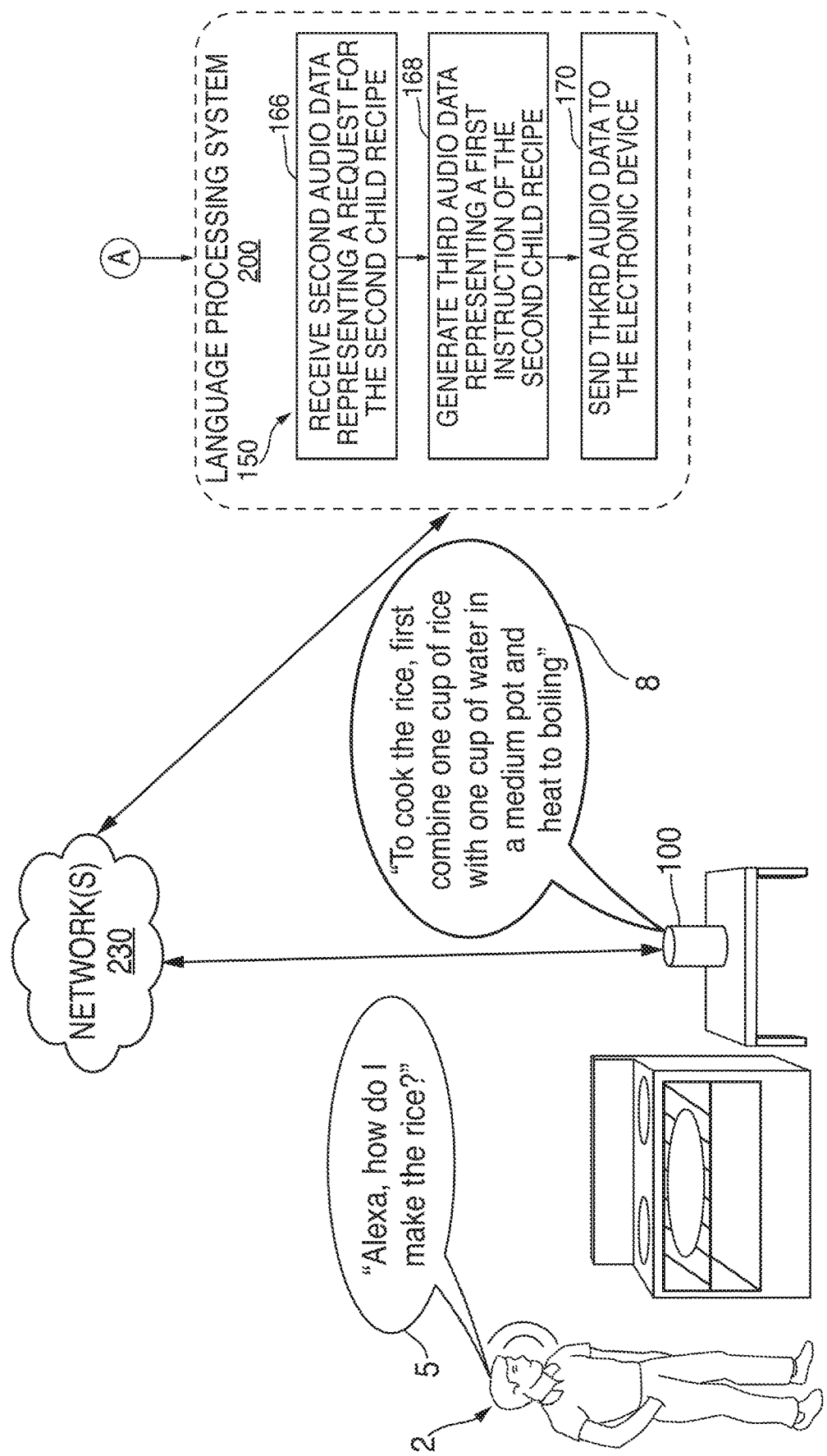
FIG. 1B is an illustrative diagram of an exemplary system where the voice-controlled electronic device of FIG. 1A receives a request to provide instructions regarding preparing a child recipe in accordance with various embodiments.

The use of chicken and rice in FIGS. 1A and 1B is merely exemplary, and any cooking recipe may be used. Additionally, the use of a cooking recipe is merely exemplary and any multi-step process may be used. For example, a multi-step process may be represented by process text data. Moreover, instead of cooking child recipes, a multi-step process may comprise nested child processes (i.e. a first child process and a second child process). Furthermore, in some embodiments, the steps within process 150 in FIGS. 1A and 1B may be rearranged or omitted.

FIG. 1B is an illustrative diagram of an exemplary system where the voice-controlled electronic 100 device of FIG. 1A receives a request to provide instructions regarding preparing a child recipe in accordance with various embodiments. After hearing the first step of the cooking recipe, individual 2 may decide that he or she would like to hear step-by-step instructions for a child recipe. In a non-limiting embodiment, individual 2 may speak second utterance 5 to their voice-controlled electronic device 100. For example, individual 2 may speak second utterance 5, "Alexa, how do I make the rice?" In response to detecting a wakeword "Alexa," voice-controlled electronic device 100 may begin packing and sending audio data representing second utterance 5 to language processing system 200 over network(s) 230. A more detailed description of voice-controlled electronic device 100, language processing system 200, and network(s) 230 are located below in connection with FIG. 2 and the same descriptions apply herein.

In some embodiments, in response to second utterance 5, language processing system 200 may continue process 150. Process 150, in some embodiments, may continue at step 168. At step 168, language processing system receives second audio data representing a request for the second child recipe. For example, language processing system may receive second audio data representing second utterance 5. Language processing system 200 may determine the intent of second utterance 5 is to receive the second child recipe. For a more detailed description of determining an intent of an utterance, see below in the description of FIG. 2.

Process 150 may continue at step 170. At step 170 may generate third audio data representing a first instruction of the second child recipe. Once language processing system 200 has determined that the intent of second utterance 5 is to receive step-by-step instructions of the second child recipe, language processing system may generate audio data representing the first step of the second child recipe. Language processing system may generate audio data by executing text-to-speech functionality on text data representing the first step of the second child recipe. For example, returning to the exemplary steps for chicken and rice provided above, language processing system 200 may generate audio data representing "To cook the rice, combine one cup of rice with one cup of water in a medium pot and heat to boiling." In some embodiments, text-to-speech may be executed by using text-to-speech 264 described below in connection with FIG. 2, and the same description applies herein. In some embodiments, language processing system 200 may generate additional audio data to make the audio output more conversational. For example, in order to give a response that sounds more conversational, language processing system may add the words "To cook the rice," For a more detailed description on the functionalities of language processing system 200, see the description of language processing system 200 below in connection with FIG. 2.

Process 150 may continue at step 172. At step 172 may send the third audio data to the electronic device. In some embodiments, language processing system 200 may send the second audio data to voice-controlled electronic device 100 causing voice-controlled electronic device 100 to output second response 8, "To cook the rice, first combine one cup of rice with one cup of water in a medium pot and heat to boiling." Voice-controlled electronic device 100 may output the second audio data using speaker(s) 210—which is described below in connection with FIG. 2. In some embodiments, language processing system 200 may generate additional audio data, letting individual 2 know that voice-controlled electronic device 100 is listening for a prompt to start the next step. For example, language processing system 200 may generate and output audio data representing the following statement "to continue to the next step of the rice recipe, just say next." In those embodiments, voice-controlled electronic device may listen for a response for a predetermined amount of time. For example, voice-controlled electronic device 100 may listen for one minute, waiting for individual 2 to say next. If, within that minute, individual 2 states "next," language processing system may repeat steps 168 and 170 on a second step of the second child recipe. If individual 4 does not respond within that window, voice-controlled electronic device 100 may stop listening, which, in some embodiments, may require individual 2 to state a wakeword in order to get voice-controlled electronic device to send audio data to language processing system 200. If, in some embodiments, individual 2 says "Next" and there are no more steps, language processing system 200 may generate audio data representing the next step in the cooking recipe text data. For example, if there are no more steps in the rice recipe, language processing system 200 may generate audio data representing "To cook the chicken, first heat two teaspoons of olive oil on a medium pan until hot." After generating the audio data representing the next step of the cooking recipe, language processing system may output the audio data representing the next step of the cooking recipe to electronic device 100. In some embodiments, when the child recipe is finished, language processing system 200 may generate audio data representing "To cook the chicken, first heat two teaspoons of olive oil on a medium pan until hot." After generating the audio data representing the next step of the cooking recipe, language processing system may output the audio data representing the next step of the cooking recipe to electronic device 100.

Again, the use of a cooking recipe is merely exemplary and any multi-step process may be used. For example, a multi-step process may be represented by process text data. Moreover, instead of cooking child recipes, a multi-step process may comprise nested child processes (i.e. a first child process and a second child process). Moreover, in some embodiments, the steps within process 150 in FIGS. 1A and 1B may be rearranged or omitted.

Figure 2:
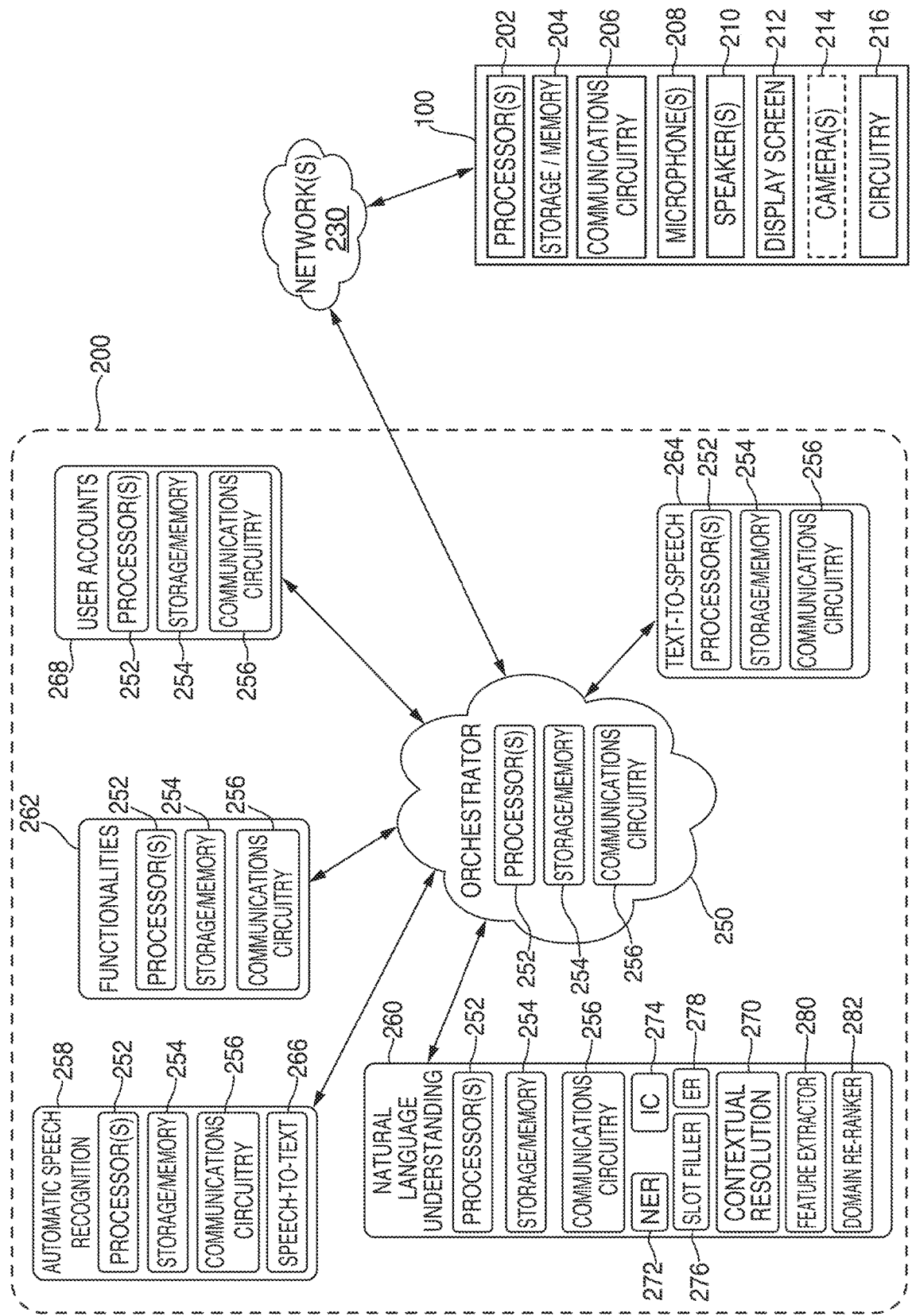
FIG. 2 is an illustrative diagram of a representative system architecture that can interact with the exemplary portable electronic device of FIGS. 1A and 1B, in accordance with various embodiments.

FIG. 2 is an illustrative diagram of a representative system architecture that can interact with the exemplary portable electronic device of FIGS. 1A and 1B, in accordance with various embodiments. Electronic device 100 may, in some embodiments, include sound controlled functionality, such as one or more voice and/or sound activated components. In some embodiments, electronic device 100 may be configured to communicate with speech-processing system 200 in response to detecting an utterance including a wakeword, which may subsequently be followed by a request/question/statement. Similarly, electronic device 100 may alternatively or additionally include one or more manually activated components for manually activating electronic device 100. In this particular scenario, electronic device 100 may also be configured, in one embodiment, to communicate with speech-processing system 200 in response to a manual input being detected by one or more input mechanisms, such as a touch screen, a button, and/or a switch, for example.

In a non-limiting embodiment, electronic device 100 may be capable of being activated in response to detecting a specific sound, such as a wakeword, as well as, or alternatively, via one or more inputs. After detecting a specific sound (e.g., a wakeword or trigger expression), electronic device 100 may recognize commands (e.g., audible commands, inputs) within captured audio, and may perform one or more actions in response to the received commands. Furthermore, electronic device 100 may also be configured to perform one or more actions in response to detecting a particular touch, or mechanical, input(s) via electronic device 100.

Electronic device 100 may correspond to any suitable type of electronic device including, but are not limited to, desktop computers, mobile computers (e.g., laptops, ultra-books), mobile phones, smart phones, tablets, televisions, set top boxes, smart televisions, personal display devices, large scale display devices (e.g., billboards, street signs, etc.), personal digital assistants ("PDAs"), gaming consoles and/or devices, smart furniture, smart household devices (e.g., refrigerators, microwaves, etc.), smart vehicles (e.g., cars, trucks, motorcycles, etc.), smart transportation devices (e.g., boats, ships, trains, airplanes, etc.), wearable devices (e.g., watches, pins/broaches, headphones, etc.), and/or smart accessories (e.g., light bulbs, light switches, electrical switches, etc.). In some embodiments, electronic device 100 may be relatively simple or basic in structure such that no, or a minimal number of, mechanical input option(s) (e.g., keyboard, mouse, track pad) or touch input(s) (e.g., touch screen, buttons) are included. For example, electronic device 100 may be able to receive and output audio, and may include power, processing capabilities, storage/memory capabilities, and communication capabilities. However, in other embodiments, electronic device 100 may include one or more components for receiving mechanical inputs or touch inputs, such as a touch screen and/or one or more buttons.

Electronic device 100, in one embodiment, may include a minimal number of input mechanisms (e.g., a power on/off switch) such that functionality of electronic device 100 may solely or primarily be through audio input and audio output. For example, electronic device 100 may include, or be in communication with, one or more microphones that listen for a wakeword by continually monitoring local audio. In response to the wakeword being detected, electronic device 100 may establish a connection with speech-processing system 200, send audio data to speech-processing system 200, and await/receive a response from speech-processing system 200. In some embodiments, however, non-voice/sound activated devices may also communicate with speech-processing system 200. For example, in response to a button or touch screen being pressed, or a button or touch screen being pressed and held, a microphone associated with electronic device 100 may begin recording local audio, establish a connection with speech-processing system 200, send audio data representing the captured audio to speech-processing system 200, and await/receive a response, and/or action to be occur, from speech-processing system 200.

Speech-processing system 200 may be located within a dedicated computing device or computing system, which may or may not be in communication with one or more additional devices. For instance, speech-processing system 200 may be located on a remote computing system with which an individual subscribes to a service on. However, speech-processing system 200 may also be included within a computing system locally stored or owned by an individual.

Electronic device 100 may include one or more processors 202, storage/memory 204, communications circuitry 206, one or more microphones 208 or other audio input devices (e.g., transducers), one or more speakers 210 or other audio output devices, a display screen 212, and one or more cameras 214 or other image capturing components. However, one or more additional components may be included within electronic device 100, and/or one or more components may be omitted. For example, electronic device 100 may also include a power supply or a bus connector. As still yet another example, electronic device 100 may include one or more additional input and/or output mechanisms, such as one or more buttons, or one or more switches or knobs. Furthermore, while electronic device 100 may include multiple instances of one or more components, for simplicity only one of each component has been shown.

In some embodiments, electronic device 100 may correspond to a manually activated device, or may include the functionality of a manually activated device. A manually activated device, as described herein, may correspond to a device that is capable of being activated in response to a manual input (e.g., pressing a button, touching a portion of a touch screen, turning a knob, performing an action on a device). For example, a tap-to-talk device is one type of manually activated device. Such tap-to-talk devices, for instance, are capable of obtaining and outputting audio data in response to a button being pressed.

In one embodiment, electronic device 100 may be in communication with an additional processing device including one or more of: processor(s) 202, storage/memory 204, communications circuitry 206, microphone(s) 208, speaker(s) 210, display screen 212, and/or camera(s) 214. For example, a centralized control device of electronic device 100 may include one or more microphone(s) 208. These microphone(s) 208 may receive audio input signals, and electronic device may determine whether or not the audio input signals indicate that a wakeword was uttered. If so, then electronic device may cause audio data representing an utterance including the wakeword, or spoken after the wakeword to be sent to speech-processing system 200.

Processor(s) 202 may include any suitable processing circuitry capable of controlling operations and functionality of electronic device 100, as well as facilitating communications between various components within electronic device 100. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program systems, program data, and/or one or more operating systems. However, processor(s) 202 may run an operating system ("OS") for electronic device 100, and/or one or more firmware applications, media applications, and/or applications resident thereon. In some embodiments, processor(s) 202 may run a local client script for reading and rendering content received from one or more websites. For example, processor(s) 202 may run a local JavaScript client for rendering HTML or XHTML content received from a particular URL accessed by electronic device 100.

Storage/memory 204 may include one or more types of storage mediums such as any volatile or non-volatile memory, or any removable or non-removable memory implemented in any suitable manner to store data for electronic device 100. For example, information may be stored using computer-readable instructions, data structures, and/or program systems. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include a media system, which may be configured to facilitate communications between electronic devices 100 and speech-processing system 200. For example, the media system may store one or more communications protocols that may be executed by processor(s) 202 for facilitating communications for device 100. In some embodiments, a sessions initiation protocol ("SIP") may be used to facilitate media transfer between electronic device 100 and one or more of speech-processing system 200 and another electronic device 100. SIP, for example, is an application layer protocol that is text based, and may employ Real-time Transport Protocol ("RTP") or Secure Real-time Transport Protocol ("SRTP") functions. In particular, PJSIP communications functionality may be employed to support audio, video, presence, and messaging communications for electronic device 100. In some embodiments, a Web Real-Time Communications ("WebRTC") protocols may be employed by electronic device 100. In a non-limiting embodiment, the media system may include instructions that indicate which communications protocols to employ for facilitating media transfer between devices based on a device type of electronic device 100. For example, if electronic device 100 does not include display 212 and/or camera 214, then the media system may indicate that PJSIP should be used, whereas if electronic device 100 includes display 212 and/or camera 214 then the media system may indicate that WebRTC protocols should be used.

In some embodiments, storage/memory 204 may include one or more systems and/or databases, such as a speech recognition system, a wakeword database, a sound profile database, and a wakeword detection system. The speech recognition system may, for example, include an automatic speech recognition ("ASR") component that recognizes human speech in detected audio. The speech recognition system may also include a natural language understanding ("NLU") component that determines user intent based on the detected audio. Also included within the speech recognition system may be a text-to-speech ("TTS") component capable of converting text to speech to be output by speaker(s) 210, and/or a speech-to-text ("STT") component capable of converting received audio signals into text to be sent to speech-processing system for processing.

The wakeword database may be a database stored locally by storage/memory 204 of electronic device 100, and may include a list of a current wakeword for electronic device 100, as well as one or more previously used, or alternative, wakewords for voice-controlled electronic device. In some embodiments, an individual may set or program a wakeword for their electronic device 100. The wakeword may be programmed directly on electronic device 100, or a wakeword or wakewords may be set by the individual via a local client application that is in communication with speech-processing system 200. For example, an individual may use their mobile device having the speech-processing system application running thereon to set the wakeword. The specific wakeword may then be communicated from the mobile device to speech-processing system 200, which in turn may send/notify electronic device 100 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on electronic device 100. In this way, if a particular sound (e.g., a wakeword or phrase) is detected, a corresponding command or request may be ignored, for example. A sound profile, for example, may correspond to a frequency and temporal decomposition of a particular audio file or audio portion of any media file, such as an audio fingerprint or spectral representation.

The wakeword detection system may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An HMM model represents a word as a series of states. Generally, a portion of an audio signal is analyzed by comparing its HMM model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, electronic device 100 may then begin transmitting the audio signal to speech-processing system 200 for detecting and responds to subsequent utterances made by an individual.

In some embodiments, electronic device 100 may be configured to send a notification to speech-processing system 200 in response to the wakeword or other activation being detected. For example, in response to detecting that the wakeword, "Alexa," has been uttered, electronic device 100 may determine a current device state, and send information associated with that device state to speech-processing system. In one embodiment, the device state may indicate whether or not content is currently being rendered by electronic device 100. For example, electronic device 100 may be receiving display data representing content, such as a graphical user interface, from a particular application associated with speech-processing system 200. In this instance, electronic device 100 may be configured to send a notification to speech-processing system 200 indicating that, at the time when the wakeword was uttered, content was currently being displayed thereby. The notification may, in one embodiment, be a logical 1/0, or TRUE/FALSE indicator that represents whether content is being displayed, or whether content is not being displayed. In some embodiments, additional information corresponding to what particular content is being displayed, what additional applications are running on electronic device 100, whether presence has been detected proximate to electronic device 100, and the like, may also be provided to speech-processing system 200 in response to the wakeword being uttered.

In some embodiments, storage/memory 204 may store voice biometric data associated with one or more individuals. For example, an individual that operates electronic device 100 may have a registered user account on speech-processing system 200 (e.g., within accounts system 268). In some embodiments, electronic device 100 may be associated with a group account, and various individuals may have user accounts that are operating under the rules and configurations of the group account. In one illustrative embodiment, voice biometric data for each member of the group account may be stored by that member's corresponding user account. The voice biometric data, for instance, may correspond to a "voice print," "voice model," or acoustic feature vector of a particular individual, which may be a graphical representation of a person's voice including a frequency decomposition of that individual's voice.

Communications circuitry 206 may include any circuitry allowing or enabling one or more components of electronic device 100 to communicate with one another, and/or with one or more additional devices, servers, and/or systems. For example, communications circuitry 206 may facilitate communications between electronic device 100 and speech-processing system 200. As an illustrative example, audio data representing an utterance (e.g., first utterance 4 of FIG. 1) may be transmitted over a network 230, such as the Internet, to speech-processing system 200 using any number of communications protocols. For example, network(s) 230 may be accessed using Transfer Control Protocol and Internet Protocol ("TCP/IP")(e.g., any of the protocols used in each of the TCP/IP layers), Hypertext Transfer Protocol ("HTTP"), WebRTC, SIP, and wireless application protocol ("WAP"), are some of the various types of protocols that may be used to facilitate communications between electronic device 100 and speech-processing system 200. In some embodiments, electronic device 100 and speech-processing system 200 may communicate with one another via a web browser using HTTP. Various additional communication protocols may be used to facilitate communications between electronic device 100 and speech-processing system 200, including, but not limited to, Wi-Fi (e.g., 802.11 protocol), Bluetooth, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, Bit-Torrent, FTP, RTP, RTSP, SSH, and/or VOIP.

Communications circuitry 206 may use any communications protocol, such as any of the previously mentioned exemplary communications protocols. In some embodiments, electronic device 100 may include one or more antennas to facilitate wireless communications with a network using various wireless technologies (e.g., Wi-Fi, Bluetooth, radiofrequency, etc.). In yet another embodiment, electronic device 100 may include one or more universal serial bus ("USB") ports, one or more Ethernet or broadband ports, and/or any other type of hardwire access port so that communications circuitry 206 allows electronic device 100 to communicate with one or more communications networks.

Electronic device 100 may also include one or more microphones 208 and/or transducers. Furthermore, one or more microphones located within a separate device may be in communication with electronic device 100 to capture sounds for electronic device 100. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, electronic device 100 may include multiple microphones (e.g., four, seven, ten, etc.) placed at various positions about electronic device 100 to monitor/capture any audio outputted in the environment where electronic device 100 is located. The various microphones 208 may include some microphones optimized for distant sounds, while some microphones may be optimized for sounds occurring within a close range of electronic device 100. In some embodiments, microphone(s) 208 may only begin to detect audio signals in response to a manual input to electronic device 100. For example, a manually activated device may begin to capture audio data using microphone(s) 208 in response to a user input, such as pressing a button, tapping a touch screen, or providing any touch input gesture to a touch input component.

Electronic device 100 may include one or more speakers 210. Furthermore, electronic device 100 may be in communication with one or more speaker(s) 210. Speaker(s) 210 may correspond to any suitable mechanism for outputting audio signals. For example, speaker(s) 210 may include one or more speaker units, speaker housings, transducers, arrays of speakers, and/or arrays of transducers that may be capable of broadcasting audio signals and/or audio content to a surrounding area where electronic device 100 may be located. In some embodiments, speaker(s) 210 may include headphones or ear buds, which may be wirelessly wired or hard-wired to electronic device 100 and capable of broadcasting audio directly to an individual.

In some embodiments, one or more microphones 208 may serve as input devices to receive audio inputs. Electronic device 100, in the previously mentioned embodiment, may then also include one or more speakers 210 to output audible responses. In this manner, electronic device 100 may function solely through speech or audio, without the use or need for any input mechanisms or displays, however this is merely exemplary.

Display screen 212 may correspond to a display device and/or touch screen, which may be any size and/or shape and may be located at any portion of electronic device 100. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display device including capacitive sensing panels capable of recognizing touch inputs thereon. For instance, display screen 212 may correspond to a projected capacitive touch ("PCT"), screen include one or more row traces and/or driving line traces, as well as one or more column traces and/or sensing lines. In some embodiments, display screen 212 may be an optional component for electronic device 100. For instance, electronic device 100 may not include display screen 212. Such devices, sometimes referred to as "headless" devices, may output audio, or may be in communication with a display device for outputting viewable content.

In some embodiments, electronic device 100 may receive content capable of being rendered by display screen 212 from speech-processing system 200. For example, a video functionality associated with speech-processing system 200 may send video data to electronic device 100, which in turn may be output by display screen 212. As another example, one or more functionalities/applications associated with speech-processing system may generate display data representing a graphical user interface, which may be sent to electronic device 100 and displayed by display screen 212.

Display screen 212, in one non-limiting embodiment, may include an insulator portion, such as glass, coated with a transparent conductor, such as indium tin oxide ("InSnO" or "ITO"). In general, one side of the touch screen display may be coated with a conductive material. A voltage may be applied to the conductive material portion generating a uniform electric field. When a conductive object, such as a human finger, stylus, or any other conductive medium, contacts the non-conductive side, typically an outer surface of display screen 212, a capacitance between the object and the conductive material may be formed. Processor(s) 202 may be capable of determining a location of the touch screen associated with where the capacitance change is detected, and may register a touch input as occurring at that location.

In some embodiments, display screen 212 may include multiple layers, such as a top coating layer, a driving line layer, a sensing layer, and a glass substrate layer. As mentioned previously, the glass substrate layer may correspond to an insulator portion, while the top coating layer may be coated with one or more conductive materials. The driving line layer may include a number of driving lines, and the sensing layer may include a number of sensing lines, which are described in greater detail below. One or more additional layers, or spaces between layers, may be included. Furthermore, any number of driving lines and sensing lines for driving the line layer and the sensing layer, respectively, may be used.

In some embodiments, the driving lines and the sensing lines of the driving line layer and the sensing line layer, respectively, may form a number of intersection points, where each intersection functions as its own capacitor. Each sensing line may be coupled to a source, such that a charge is provided to each sensing line, and changes in capacitance of a particular driving line and sensing line are detectable thereby. In response to a conductive object being brought proximate, or substantially touching an outer surface of the top coating layer, a mutual capacitance of a particular capacitor (e.g., an intersection point) may reduce in magnitude. In other words, a voltage drop may be detected at a location on display screen 212 corresponding to where a conductive object contacted display screen 212.

A change in capacitance may be measured to determine a location on the touch screen where the object has contacted the surface. For example, if an individual touches a point on display screen 212, then a corresponding driving line and sensing line that intersect at that point may be identified. A location of the point may have one or more pixels associated with that location, and therefore one or more actions may be registered for an item or items that are displayed at that location. Processor(s) 202 of electronic device 100 may be configured to determine which pixels are associated with a particular location point, and which item or items are also displayed at that pixel location. Furthermore, electronic device 100 may be configured to cause one or more additional actions to occur to the item or items being displayed on display screen 212 based on a temporal duration the touch input, and or if one or more additional touch inputs are detected. For example, an object that contacted display screen 212 at a first location may be determined, at a later point in time, to contact display screen 212 at a second location. In the illustrative example, an object may have initially contacted display screen 212 at the first location and moved along a particular driving line to the second location. In this scenario, a same driving line may have detected a change in capacitance between the two locations, corresponding to two separate sensing lines.

The number of driving lines and sensing lines, and therefore the number of intersection points, may directly correlate to a "resolution" of a touch screen. For instance, the greater the number of intersection points (e.g., a greater number of driving lines and sensing lines), the greater precision of the touch input. For instance, a touch screen display screen 212 having 100 driving lines and 100 sensing lines may have 100 intersection points, and therefore 100 individual capacitors, while a touch screen display screen 212 having 10 driving lines and 10 sensing lines may only have 10 intersection points, and therefore 10 individual capacitors. Therefore, a resolution of the touch screen having 100 intersection points may be greater than a resolution of the touch screen having 10 intersection points. In other words, the touch screen having 100 intersection points may be able to resolve a location of an object touching the touch screen with greater precision than the touch screen having 10 intersection points. However, because the driving lines and sensing lines require a voltage to be applied to them, this may also mean that there is a larger amount of power drawn by electronic device 100, and therefore the fewer driving lines and/or sensing lines used, the smaller the amount of power that is needed to operate the touch screen display.

In some embodiments, display screen 212 may correspond to a high-definition ("HD") display. For example, display screen 212 may display images and/or videos of 720p, 1080p, 1080i, or any other image resolution. In these particular scenarios, display screen 212 may include a pixel array configured to display images of one or more resolutions. For instance, a 720p display may present a 1024 by 768, 1280 by 720, or 1366 by 768 image having 786,432; 921,600; or 1,049,088 pixels, respectively. Furthermore, a 1080p or 1080i display may present a 1920 pixel by 1080 pixel image having 2,073,600 pixels. However the aforementioned display ratios and pixel numbers are merely exemplary, and any suitable display resolution or pixel number may be employed for display screen 212, such as non-HD displays, 4K displays, and/or ultra displays.

In some embodiments, content displayed on display screen 212 may be formatted such that contextual entities and lists are able to be analyzed by speech-processing system 200 for list resolution and/or anaphora resolution. Context related to the displayed content may include entities associated with electronic device 100 including, but not limited to, foreground entities (e.g., lists of items, detail pages), background entities (e.g., songs, audio books), and notification entities. The contextual metadata may be structured into contextual entity slots, list metadata, and any other additional data available. For example, contextual entity slots may correspond to data used for list resolution and/or anaphora resolution. The contextual entity slots may be specified in domain definitions with corresponding values. The list metadata may include list identifiers, item identifiers for items of a list, and absolute positions of the list for a particular item (e.g., a first item of a list, a second item of a list, etc.). Such additional data may include unique identifiers associated with an object, item prices, quantities, and the like.

In some embodiments, electronic device 100 may include one or more cameras 214, corresponding to any suitable image capturing component or components capable of capturing one or more images and/or videos. Camera(s) 214 may, in some embodiments, be configured to capture photographs, sequences of photographs, rapid shots (e.g., multiple photographs captured sequentially during a relatively small temporal duration), videos, or any other type of image, or any combination thereof. In some embodiments, electronic device 100 may include multiple cameras 214, such as one or more front-facing cameras and/or one or more rear facing cameras. Furthermore, camera(s) 214 may be configured to recognize far-field imagery (e.g., objects located at a large distance away from electronic device 100) or near-filed imagery (e.g., objected located at a relatively small distance from electronic device 100). In some embodiments, the camera(s) may be high-definition ("HD") cameras, capable of obtaining images and/or videos at a substantially large resolution (e.g., 726p, 1080p, 1080i, etc.). In some embodiments, camera(s) 214 may be optional for electronic device 100. For instance, camera(s) 214 may be external to, and in communication with, electronic device 100. For example, an external camera may be capable of capturing images and/or video, which may then be provided to electronic device 100 for viewing and/or processing.

In some embodiments, display screen 212 and/or camera(s) 214 may be optional for electronic device 100. For instance, electronic device 100 may function using audio inputs, and outputting audio in response or causing one or more actions to occur in response, and therefore display screen 212 and/or camera(s) 214 may not be included. Furthermore, in some embodiments, electronic device 100 may not include display screen 212 and/or camera(s) 214, but instead may be in communication with display screen 212 and/or camera(s) 214. For example, electronic device 100 may be connected to a display screen via a Wi-Fi (e.g., 802.11 protocol) connection such that visual content sent to electronic device 100 may be sent to the display screen, and output thereby.

In one exemplary embodiment, electronic device 100 may include an additional input/output ("I/O") interface. For example, electronic device 100 may include one or more input components capable of receiving user inputs. Various types of input components may include, but are not limited to, keyboards, buttons, switches, a mouse, joysticks, or an external controller may be used as an input mechanism for the I/O interface. In some embodiments, the output portion of the I/O interface of electronic device 100 may include one or more lights, light emitting diodes ("LEDs"), or other visual indicator(s). In some embodiments, one or more features of the output portion of the I/O interface may be included in a purely voice activated version of electronic device 100. For example, one or more LED lights may be included on electronic device 100 such that, when microphone(s) 208 receive audio, the one or more LED lights become illuminated signifying that audio has been received by electronic device 100. In some embodiments, one or more vibrating mechanisms or other haptic features may be included with electronic device 100 to provide a haptic response to an individual.

In some embodiments, electronic device 100 may include radio-frequency identification ("RFID") functionality and/or near field communication ("NFC") functionality. Furthermore, in some embodiments, electronic device 100 may include one or more infrared ("IR") sensors and one or more IR emitters. The IR sensors/emitters may be used to determine depth information. For example, in one embodiment, a distance of an individual from electronic device 100 may be determined using the one or more IR sensors/emitters. Depth determination may be performed using any depth determination technique. In some embodiments, a distance between an individual and electronic device 100 may be employed as a basis for presenting content with varying density using display screen 212. In some embodiments, electronic device 100 may include beaconing functionality that allows electronic device 100 to recognize when one or more devices are located nearby. For example, electronic device 100 may include beaconing detection functionality that generates a beaconing signal, and attempts to determine whether any devices nearby are capable of detecting that signal. If so, then that may indicate that a particular device is proximate to electronic device 100.

In some embodiments, contextual metadata may be obtained by computer vision analysis of an object detected by camera(s) 214. For example, in response to speaking the utterance, "Buy this," electronic device 100 may cause camera(s) 214 to capture an image. That image may be analyzed to determine what the object is, and the contextual metadata associated with that object's identity may be determined. For instance, if an individual is holding up a bottle of ketchup, then the computer vision analysis may be able to determine a product name, bar code, and/or any other attribute about the bottle of ketchup from the captured image, and may populate a contextual metadata structure indicating the determined values (e.g., 'Item Name' slot: "Ketchup").

Speech-processing system 200 may include various components and modules including, but not limited to, automatic speech recognition ("ASR") system 258, natural language understanding ("NLU") system 260, functionalities system 262, text-to-speech ("TTS") module 264, and user accounts system 268. In some embodiments, speech-processing system 200 may also include an orchestrator system 250 capable of orchestrating one or more processes to be performed by one or more of ASR system 258, NLU system 260, functionalities system 262, TTS system 264, and/or user accounts system 268, as well as one or more additional components, devices, and/or systems associated therewith. Speech-processing system 200 may also include computer readable media, including, but not limited to, flash memory, random access memory ("RAM"), and/or read-only memory ("ROM"). Speech-processing system 200 may also include various modules that store software, hardware, logic, instructions, and/or commands for speech-processing system 200, such as a speaker identification ("ID") module, or any other module, or any combination thereof.

ASR system 258 may be configured to recognize human speech in detected audio, such as audio captured by electronic device 100, which may then be transmitted to speech-processing system 200. ASR system 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. Processor(s) 252, in one embodiment, may be configured to perform one or more of the corresponding functions associated with ASR system 258, as described herein, based on data received by communications circuitry 256 and/or information stored by storage/memory 254. Furthermore, in some embodiments, ASR system 258 may include speech-to-text ("STT") system 266. STT system 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR system 258 may include an expression detector that analyzes audio signals received by speech-processing system 200, such as the expression detector mentioned above with regards to electronic device 100. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical 1/0) to indicate whether or not the predefined word or expression was represented in the audio signal. In some embodiments, an expression detector may be configured to analyze the audio signal to produce a confidence score indicating a likelihood that a particular word or phrase, is represented within the audio signal. The expression detector may then compare that confidence score to a threshold value to determine whether that word or phrase will be declared as having been spoken. In some embodiments, the confidence scores associated with each word may be provided to NLU system 260, and in particular, feature extractor system 280, as described in greater detail below.

For instance, ASR system 258 may transcribe received audio data into text data representing the words of the speech contained in the audio data using SIT system 266. The text data may then be used by other components for various purposes, such as executing system commands, inputting data, etc. ASR system 258 may then interpret an utterance based on the similarity between the utterance and pre-established language models stored in an ASR model knowledge base of storage/memory 254. For example, the input audio data may be compared with models for sounds (e.g., sub-word units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing a likelihood that a particular set of words matches those spoken in the utterance. The confidence score may be based on a number of factors including, for example, the similarity of the sound in the utterance to models for language sounds (e.g., an acoustic model), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, ASR system 258 may output the most likely text recognized in the audio data. ASR system 258 may also output multiple hypotheses in the form of a lattice or an N-best list with each hypothesis corresponding to a confidence score or other score (such as probability scores, etc.).

ASR system 258 may further attempt to match received feature vectors to language phonemes and words as known in acoustic models and language models stored within storage/memory 254 of ASR system 258. Recognition scores may be determined for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving the likelihood that the speech recognition process will output speech results that make sense grammatically. The specific models used may be general models or may be models corresponding to a particular domain, such as music, application enablement/disablement, shopping, etc.

ASR system 258 may generate results in the form of a single textual representation of the speech, an N-best list including multiple hypotheses and respective scores, and/or lattice, for example, which may be sent to NLU system 260 for processing, such as conversion of the text into commands for execution, either by electronic device 100, speech-processing system 200, or by another device, such as a separate device or server capable of performing one or more additional functionalities thereon (e.g., a television capable of outputting video content).

NLU system 260 may be configured such that it determines an intent of an utterance based on the received audio data. NLU system 260 may determine one or more domains, which may also be referred to as categories, that may be capable of handling the intent of the utterance. For example, "Play 'Video 1'," may be identified by each of a "Music" domain, an "E-Book" domain, and a "Video" domain as possibly being able to handle the corresponding request. For instance, NLU system 260 may identify that the word "Play" may be a recognized intent of each of the aforementioned domains (as well, possibly, other domains). In some embodiments, to determining an utterance's intent, NLU system 260 may communicate with functionalities system 262 to cause one or more specific functionalities to be accessible, perform one or more tasks, and/or retrieve an appropriate response or response information. NLU system 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply. Processor(s) 252, in one embodiment, may be configured to perform one or more of the corresponding functions associated with NLU system 260, as described herein, based on data received by communications circuitry 256 and/or information stored by storage/memory 254, as well as based on NER system 272, IC system 274, slot filler system 276, entity resolution system 278, contextual resolution system 270, feature extractor system 280, domain re-ranker system 282, and/or domain classifier system 286.

NLU system 260 may include a named entity recognition ("NER") system 272, which may be used to identify portions of text that correspond to a named entity recognizable by NLU system 260. A downstream process called named entity resolution may be configured to link a portion of text to an actual specific known entity. To perform named entity resolution, NLU system 260 may utilize gazetteer information stored in an entity library storage. The gazetteer information may be used for entity resolution, for example matching ASR results with different entities (such as song titles, contact names, etc.). Gazetteers may be linked to a user account or profile of users accounts module 268, certain domains (e.g., music or shopping), or may be organized in a variety of other ways.

Generally, NLU system 260 takes textual input and attempts to make a semantic interpretation of the text. That is, NLU system 260 may be configured to determine a meaning of text based on the individual words and then implements that meaning. In some embodiments, NLU system 260 may interpret a text string to derive an intent or a desired action of the utterance (e.g., first utterance 4) as well as the pertinent pieces of information in the text that allow an action to be completed. For example, if a spoken utterance is processed by ASR system 258 and outputs the hypothesis text, "call mom," NLU system 260 may determine that an intent of the utterance is to activate a telephone, or telephone functionality, and to initiate a call with a contact matching the entity "mom." In some embodiments, NLU system 260 may process several textual inputs (e.g., hypotheses texts) related to the same utterance. For example, if ASR system 258 outputs N hypothesis texts (as part of an N-best list), then NLU system 260 may process all N outputs.

As will be discussed further below, NLU system 260 may be configured to parse and tag annotate text. For example, for the text "call mom," "call" may be tagged as a command (e.g., a command to execute a phone call), and "mom" may be tagged as a specific entity and target of the command (e.g., a telephone number for the entity corresponding to "mom" stored in a contact list). Further, NLU system 260 may be used to provide answer data in response to queries, for example using a knowledge base stored within storage/memory 254 of NLU system 260 and/or storage/memory of speech-processing system 200.

To correctly perform natural language understanding processing of speech input, NLU system 260 may be configured to determine a domain of an utterance. By determining the domain, NLU system 260 may narrow down which services and functionalities offered by an endpoint device (e.g., electronic device 100, speech-processing system 200, or any other electronic device or system) may be relevant. For example, an endpoint device may offer services relating to interactions with a telephone service, a contact list service, a calendar/scheduling service, a music player service, etc. As another example, an endpoint device may enable certain services or functionalities for an individual having a user account of speech-processing system 200. Words in a single hypothesis text query may implicate more than one service, and some services may be functionally linked (e.g., both a telephone service and a calendar service may utilize data from the contact list).

NER system 272 may be configured to receive a hypothesis text query in the form of one or more results from ASR system 258. NER system 272, may then attempt to identify relevant grammars and lexical information that may be used to construe meaning of the one or more results. To do so, NER system 272 may begin by identifying potential domains that may relate to the received query. NLU system 260, may include a databases of devices within storage/memory 254 of NLU system 260 that may be used to identify domains associated with specific devices. For example, electronic device 100 may be associated with domains for music, telephone functionality, calendar information, contact lists, and/or device-specific communications. In addition, NLU system 260 may store an entity library including database entries for specific services available on a specific device or devices, either indexed by that device's identification number, a customer identification number, a household identification number, and/or using any other suitable indicator.

In one non-limiting embodiment, a domain may represent a discrete set of activities, services, and/or functionalities that have a common theme, such as "shopping," "music," and/or "videos." As such, each domain may be associated with a particular language model and/or grammar database, a particular set of intents/actions, and a particular personalized lexicon. In some embodiments, each user account may have its own language model including words, phrases, sentence structures, response templates, and the like, configured for the user account. Each gazetteer may include domain-indexed lexical information associated with a particular user account of user accounts system 268 and/or electronic device 100. For example, a first gazetteer may include first domain-index lexical information. A user's music-domain lexical information might include album titles, artist names, and song names, for example, whereas a user's contact-list lexical information might include the names of contacts. Since every user's music collection and contact list is presumably different, this personalized information improves entity resolution.

In some embodiments, NLU system 260 may be configured to apply the rules, models, and information applicable to each identified domain. For example, if a query potentially implicates both communications and music, the query may, substantially in parallel, cause NLU system 260 to use the grammar models and lexical information for communications, as well as the grammar models and lexical information for music. The responses based on the query produced by each set of models is scored, with the overall highest ranked result from all applied domains is ordinarily selected to be the correct result.

An intent classification ("IC") system 274 may parse the query to determine an intent or intents for each identified domain, where the intent corresponds to the action to be performed that is responsive to the query. Each domain is associated with a database of words linked to intents. For example, a music intent database of a music domain may link words and phrases such as "play," to a "Play Music" intent, "stop," to a stop playing music intent, and "mute" to a mute volume intent. IC system 274 may be configured to identify potential intents for each domain by comparing words in the query to the words and phrases in that domain's intents database. Traditionally, the determination of an intent by IC system 274 is performed using a set of rules or templates that are processed against the incoming text to identify a matching intent.

In order to generate a particular interpreted response, NER system 272 applies the grammar models and lexical information associated with a respective domain to actually recognize one or more entities in the text of the query. Each grammar model includes the names of entities (i.e., nouns) commonly found in speech about that particular domain (i.e., generic terms), whereas the lexical information from the gazetteer is personalized to the user(s) and/or the device. For instance, a grammar model associated with the shopping domain may include a database of words commonly used when people discuss shopping.

The intents identified by IC system 274 may be linked to domain-specific grammar frameworks having "slots" or "fields" to be filled. Each slot or field may correspond to a portion of the query text that the system believes corresponds to an entity. For example, if "play music" is an identified intent, a grammar framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

NER system 272 may parse the hypothesis text query to identify words as being subject, object, verb, preposition, etc., based on grammar rules and/or models, prior to resolving named entities. The identified verb may be used by IC module 274 to identify, or initially identify, an intent, which is then used by NER system 272 to identify frameworks. A framework for an intent of "play" may specify a list of slots/fields/placeholders applicable to place the identified "object," such as, for example, {Artist Name}, {Album Name}, {Song Name}, {Application Name}, {Anaphoric Term}, and any object modifier (e.g., a prepositional phrase). NER system 272 may then search the corresponding fields in the domain-specific and personalized lexicon(s), attempting to match words and phrases in the query, which are tagged as a grammatical object or object modifier, with those identified in the database(s).

This process may include semantic tagging, which is the labeling of a word or a combination of words according to their type/semantic meaning. Parsing may be performed using heuristic grammar rules, or an NER model may be constructed using techniques such as hidden Markov models, maximum entropy models, log linear models, conditional random fields ("CRF"), and the like.

For instance, a hypothesis text query from an utterance of "Play 'Song 1' by 'Artist 1'," might be parsed and tagged as {Verb}: "Play," {Object}: "Song 1," {Object Preposition}: "by," and {Object Modifier}: "Artist 1." At this point in the process, "Play" may be identified as a verb based on a word database associated with the music domain, which IC module 276 may determine corresponds to the "play music" intent. No determination has been made as to the meaning of "Song 1" and "Artist 1," but based on grammar rules and models, it may be determined that the text of these phrases relate to the grammatical object (i.e., entity) of the query. Similarly, "Play" may also be identified as verb based on a word database associated with a video domain, an e-book domain, and/or one or more additional domains.

The frameworks linked to the intent may then be used to determine what database fields should be searched to determine the meaning of these phrases, such as searching a user's gazette for similarity with the framework slots. So a framework for a "play music" intent might attempt to resolve the identified object for {Artist Name}, {Album Name}, {Song Name}, and {Application Name}, {Anaphoric Term} and another framework for the same intent might attempt to resolve the object modifier based on {Artist Name}, and resolve the object based on {Album Name} and {Song Name} linked to the identified {Artist Name}. If the search of the gazetteer does not resolve a slot/field using gazetteer information, NER system 272 may search the database of generic words associated with the particular domain. So for instance, if the query was "play songs by 'Artist 1,'" after failing to determine an album name or song name called "songs" by "Artist 1," NER system 272 may search the domain vocabulary for the word "songs." For example, use of the object "songs" may correspond to some or all of the songs associated with a particular artist (e.g., "Artist 1"). In the alternative, generic words may be checked before the gazetteer information, or both may be tried, potentially producing two different results.

The results of the natural language understanding processing may be tagged to attributing meaning to the query. So, for instance, "Play 'Song' by 'Artist 1'" might produce a result of: {Domain}: "Music," {Intent}: "Play Music," {Artist Name}: "Artist 1," {Media Type}: "Song," and {Song Name}: "Song 1." As another example, "Play songs by 'Artist 1'" might produce: {Domain}: "Music," {Intent}: "Play Music," {Artist Name}: "Artist 1," and {Media Type}: Song. Still further, "Add this to my cart" might produce a result of: {Domain} Shopping, {Intent} "Add item to," {Anaphoric Term}: "this," and {List Type} "cart."

The output from NLU system 260 (which may include tagged text, commands, etc.) may then be sent to orchestrator 250 and/or a command processor, which may be located on, or may be in communication with, speech-processing system 200. The destination command processor may be determined based on the output of NLU system 260. For example, if NLU system 260 outputs include a command to play music, the destination command processor may be a music playing application, such as one located on electronic device 100 or in a music playing application, configured to execute a music playing command to cause a particular audio file to output. If the output of NLU system 260, however, includes a search request, the destination command processor may include a search engine processor, such as one located on a search server, configured to execute a search command. If the output of NLU system 260 includes a request for enablement of an application's functionalities for a particular user account, then the language model for the user account may be updated to include one or more invocations, utterance frameworks, response frameworks, and values for the frameworks, for a particular application.

In some embodiments, NLU system 260 may also include an entity resolution module 278, which allows NLU system 260 to query each domain of NLU system 260 to determine which domain or domains believe that they can handle a given request. Upon performing the query, each domain may return a "score" indicating a likelihood that they can handle the application in question. For instance, domains may return scores of LOW, MEDIUM, or HIGH, reflective of the likelihood that the particular domain can handle the particular application. Entity resolution system 278 may return application names or titles for the request, which may be based on relevance scores that estimate a confidence that a particular application/functionality may be best used for the request. As an illustrative example, if the utterance is, "Play my music," NLU system 260 may determine, using entity resolution system 278, which domains, and thus applications/functionalities, can likely handle this request, and may select the domain and/or application/functionality having the highest confidence score as being the domain and/or application able to handle the request. Furthermore, NLU system 260 may further include a slot filler module 276. Still further, in some embodiments, domain re-ranking may be performed based on contextual information regarding content being rendered by electronic device 100 at a time when the request was received.

In some embodiments, NLU system 260 may include a contextual resolution system 270, which may be a system configured to identify entities for assisting natural language understanding processing using contextual metadata corresponding to content being displayed by display screen 212. Contextual resolution system 270 may receive contextual metadata from orchestrator 250 (e.g., that may be generated and sent from a particular domain associated with functionalities system 262) and/or from electronic device 100. The contextual metadata may include information associated with the particular content currently being rendered by a requesting device. In some embodiments, the contextual metadata may be obtained in response to receiving audio data. For example, in response to receiving audio data representing first utterance 4, voice-controlled electronic device 100 may send a notification to speech-processing system 200 that indicates that content is currently being rendered by display screen 212.

In one embodiment, orchestrator 250 may be configured to receive the audio data, and may determine that the notification has also been received. Orchestrator 250 may determine whether or not the notification indicates that there is (or was) content displayed by display screen 212 at the time that the utterance was spoken (e.g., when the wakeword was uttered). However, the determination of whether content is being displayed by display screen 212 may correspond to a time just prior to the wakeword being uttered, when the wakeword was uttered, after the wakeword was uttered, during the utterance being spoken, after the utterance was spoken, and/or after the audio data is sent to speech-processing system 200, and the aforementioned is merely exemplary. The notification may correspond to a flag, such as a logical 1/0, where if the flag has a value of 1, then this may indicate that content is being rendered by electronic device 100, whereas if the flag has a value of 0, then this may indicate that not content is being rendered by electronic device 100.

Upon determining that electronic device 100 is rendering content (e.g., receiving a notification indicating that content is being displayed by display screen 212), orchestrator 250 may generate and send a request to the various domains associated with functionalities system 262 and NLU system 260. The request may inquire as to which domain, or domains, are currently providing electronic device 100 with content, such as the content being rendered. Upon determining that domain, or domains, that are providing content, orchestrator 250 may request that the identified domain(s) generate and send contextual metadata representing text corresponding to the displayed content. After receiving the contextual metadata from the corresponding domain(s), orchestrator 250 may provide the contextual metadata to contextual resolution system 270, or otherwise cause the contextual metadata to be sent to NLU system 260.

In some embodiments, the various domains may include formatting logic (e.g., speechlets) that may format the contextual metadata. The contextual metadata may be structured, in response to the formatting logic applying its formatting rules, such that attributes of the content are arranged in contextual slots including values associated with those slots. For instance, the contextual metadata may also be referred to, or may generally correspond to, entity data representing content being displayed by display screen 212 during a time when an utterance is spoken. For example, single item or detail web page of an item, such as a coffee maker, may include entity data organized into contextual slots such as {Item Name}, {List Position}, and {Item Identifier}. Values from the particular web page being displayed currently by display screen 212 may include: {Item Name}: "Coffee Maker," {List Position}: "1," and {Item Identifier}: "abcd1234." Different types of content may include different types of contextual slot data representing different contextual slots. For example, lists may include {List Types}, {List Position}, {List Name}, etc.

In some embodiments, contextual resolution system 270 may determine whether any slots/fields from intent resolution processing by NLU system 260 substantially match any slots/fields from the contextual metadata received. For instance, the entity data that is received from the domain may include similar entities (e.g. slot data) as the entities associated with the intent identified by NLU system 260. This may include having contextual slot data representing contextual slots from the contextual metadata being associated with similar attributes as the types of slot data from intent resolution by NLU system 260. As an example, the "Play Music" intent may include one or more types of slot data such as application data—{Application Data}, song name—{Song Name}, album name—{Album Name}, artist name—{Artist Name}, genre name—{Genre Name}, playlist name {Playlist Name}, media type—{Media Type}, sort type—{Sort Type}, play mode—{Play Mode}, service name—{Service Name}, anaphor—{Anaphor}, list position—{List Position}, recommend trigger—{Recommended Trigger}, and similar trigger—{Similar Trigger}. From NLU system 260, the text data may be used to identify some or all of the values for these types of slot data. For example, if the utterance is, "Play 'Song 1'," then {Song Name} may have a value "Song 1." However, the remaining slot data may representing slots that remain unfilled. The contextual metadata may indicate information regarding a GUI displayed by display screen 212, where the GUI includes a detailed page associated with a song (e.g., "Song 1") or be a list including one item, the song. For example, the contextual metadata may include slot data representing a song name contextual slot, {Song Name}, with a filled value being "Song 1," as well as an album name contextual slot, {Album Name}, having a filled value "Album 1." In this particular scenario, the album name contextual slot data {Album Name} may be provided to NLU system 260.

Contextual resolution system 270 may, in some embodiments, be configured to determine that one or more of the declared slots from the intent matches one or more contextual entity slots from the contextual metadata. This may allow for resolution of the entity based on the contextual metadata. For example, if an individual says, "Play 'Song 1'," and the contextual metadata indicates that there is contextual entity slot data {Song Name} having a value "Song 1," then the specific song to be played may be determined to be the audio filed associated with "Song 1."

Contextual resolution system 270, in one embodiment, may be configured to determine a heuristics score that indicates a number of matching entities (e.g., matching types of slot data) between the entity data/contextual metadata and the declared slots for the identified intent. For example, using the previous example, the contextual metadata may include slot data representing such types of slots as {Song Name}, {Album Name}, and/or {Artist Name}, amongst other types of slots. Therefore, in this particular scenario, the heuristics score may be three, indicating that there are three slots corresponding to similar entities for both the declared slots from IC component 274 and contextual resolution system 270. If the heuristics score is greater than zero, then NLU system 260 may be configured to generate a selected context file that may be included with the output data from NLU system 260, which orchestrator 250 may provide back to an application, or applications, of functionalities system 262 to perform, or attempt to perform, one or more actions.

NLU system 260 may also include a domain classifier 286, which may be configured to take the text data associated with the utterance and outputs a probability of that particular utterance coming from one of the domains included with NLU system 260. Each domain associated with NLU system 260 will have a probability score associated with them that indicates a probability that the utterance corresponds to that corresponding domain. The scores may be used by domain re-ranker 282 to assist in re-ranking the intent hypotheses. The probability scores for each domain, as determined by domain classifier 286, may lack the contextual knowledge associated with the utterance. Therefore, the probability scores may serve as inputs for domain re-ranker 282. Domain classification processing performed by domain classifier 286 may occur substantially in parallel to NER processing, IC processing, slot filler processing and entity resolution processing, for instance. The results of each of these processing may be used together by domain re-ranker 282 to re-rank the list of intent hypotheses.

In some embodiments, NLU system 260 may also include a feature extractor system 280, or a "feature extractor." Feature extractor system 280 may be configured to identify features associated with contextual metadata or entity data corresponding to content rendered by electronic device 100 and provided by a particular domain. For example, electronic device 100 may display a graphical user interface including a list of songs, where each item of the list includes various characteristics related to that particular song (e.g., song title, song duration, artist name, etc.). When entity data is passed to NLU system 260 from the domain responsible for providing the content (e.g., the GUI) to electronic device 100, feature extractor system 280 may be configured to "extract," or otherwise recognize, these features within the content. To do this, each domain may be configured, as mentioned previously, to format the content that will be output by that domain to include slot data that match the intent specific slot data from intent classification processing. For example, a "play music" intent may include such types of slot data as "Song Title" slot data representing a "Song Title" slot, "Artist Name" slot data representing an "Artist Name" slot, and "Album Name" slot data representing an "Album Name" slot. Therefore, in this particular example, the music domain may be configured to format the content it displays, such as a detailed page for a particular song being played or to be played, to also include slot data corresponding to one or more of the "Song Title" slot, the "Artist Name" slot, and the "Album Name" slot, which each may also include an associated value (e.g., the song's title, the artist's name, and/or the album's name). Thus, when the entity data representing the content is received, feature extractor system 280 may be able to determine that the content included slot data corresponding to the one or more slots (e.g., "Song Title" slot data, "Artist Name" slot data, and "Album Name" slot data).

Feature extractor system 280 may also, but without limitation, determine additional "features" associated with the request, the entity data, user history, and/or additional applications that are running at a time when the utterance was spoken. For example, feature extractor system 280 may determine, in addition to determining which domain is providing the content being rendered by electronic device 100, any additional domains currently "in use" by electronic device 100. For instance, if a list is being viewed while a song is playing, then feature extractor system 280 may also determine that the music domain is providing content to electronic device 100, and may extract features related to that content from the music domain. In some embodiments, feature extractor system 280 may also determine presence information associated with electronic device 100. The presence information may indicate a presence status of electronic device 100. In other words, the presence information may indicate whether or not human presence has been detected by electronic device 100. As an illustrative example, in response to receiving audio data representing an utterance, presence data indicating whether human presence has been detected proximate to electronic device 100 may also be received by speech-processing system 200. Feature extractor 280 may then be provided with the presence data to determine whether electronic device 100 has detected presence. Using feature extractor system 280, features associated with multiple aspects of a request may be employed by a domain re-ranker system 282 to re-rank domains as being more or less likely to correspond to an utterance's intent.

Functionalities system 262 may, for example, correspond to various action specific applications, which are capable of processing various task specific actions and/or performing various functionalities. Functionalities system 262 may further correspond to first party applications and/or third party applications capable of performing various tasks or actions, or performing various functionalities. For example, based on the context of the audio received from electronic device 100, speech-processing system 200 may use a certain application to generate a response, or to obtain response information, which in turn may be communicated back to electronic device 100 and/or to another electronic device (e.g., a television). Functionalities system 262 may also include processor(s) 252, storage/memory 254, and communications circuitry 256. Processor(s) 252, in one embodiment, may be configured to perform one or more of the corresponding functions associated with functionalities system 262, as described herein, based on data received by communications circuitry 256 from one or more other systems (e.g., orchestrator 250, ASR system 258, and/or NLU system 260) and/or information stored by storage/memory 254.

In some embodiments, an application of functionalities system 262 may be written in various computer languages, such as JavaScript and Java. Various applications may include an intent schema file and a sample utterances file, such as, for example, IntentSchema.json including the JSON defining the intents of a particular application, and a SampleUtterances.txt including plain text sample utterances for the particular application. Applications may also include application specific code, such as a JavaScript or Java file, common library code, and various other JavaScript or Java modules.

TTS system 264 may employ various text-to-speech techniques. TTS system 265 may include a speech synthesis system 284, which may be configured to take input text and generate audio based on the text. However, techniques for transcribing text into speech are well known in the art and need not be described in further detail herein, any suitable computer implemented text to speech technique may be used to convert the input text into output audio, such as SOFTSOUND speech processing technologies available from the Autonomy Corporation, which is headquartered in Cambridge, England, United Kingdom. TTS system 264 may also include processor(s) 252, storage/memory 254, and communications circuitry 256. Processor(s) 252, for instance, may be configured to perform one or more of the corresponding functions associated with TTS system 264, as described herein, based on data received by communications circuitry 256 from one or more additional systems (e.g., functionalities system 262, NLU system 260, etc.) and/or information stored by storage/memory 254.

User accounts system 268 may store one or more user accounts or user profiles, corresponding to users having an account on speech-processing system 200. For example, a parent may have an account registered on speech-processing system 200, and each of the parent's children may have their own user profile registered under the parent's account. Information, settings, and/or preferences, for example, for each user profile may be stored by user accounts system 268. In some embodiments, user accounts system 268 may store a voice signal, such as voice biometric information, for a specific user profile. This may allow speaker identification techniques to be used to match a voice to voice biometric data associated with a specific user profile. In some embodiments, user accounts system 268 may store a telephone number assigned to a particular user profile. In some embodiments, user accounts system 268 may include a list of media items currently stored within an individual's registered account or user profile. For example, a list of music or videos purchased or obtained by an individual may be stored within the individual's user profile on user accounts system 268, which may be accessed by the individual when the individual seeks to hear a particular song or songs, or view a particular video or videos. User accounts system 268 may also include a listing of all applications currently enabled for each user profile. In some embodiments, NLU system 260 may receive indications of which applications are currently enabled for a particular user profile or account, such that NLU system 260 is aware of which rules and capabilities that speech-processing system 200 is able to perform for the particular user profile or account. User accounts system 268 may also include processor(s) 252, storage/memory 254, and communications circuitry 256. Processor(s) 252, in one embodiment, may be configured to perform one or more of the corresponding functions associated with user accounts system 268, as described herein, based on data received by communications circuitry 256 from one or more additional systems (e.g., functionalities system 262, NLU system 260, etc.) and/or information stored by storage/memory 254

Orchestrator 250, in a non-limiting embodiment, may correspond to any suitable device, system, and/or logic capable of performing one or more processes. For example, orchestrator 250 may be configured to request contextual metadata from one or more domains/applications of functionalities system 262 in response to receive a notification from electronic device 100 that content is currently being rendered thereby. In response to receiving the contextual metadata, orchestrator 250 may be configured to provide the contextual metadata to NLU system 260. In one embodiment, orchestrator 250 may include processor(s) 252, storage/memory 254, and communications circuitry 256. Processor(s) 252, in one embodiment, may be configured to perform one or more of the corresponding functions associated with computing system 200, as described herein, based on data received by communications circuitry 256 from one or more additional systems and/or information stored by storage/memory 254

Although each of ASR system 258, NLU system 260, functionalities system 262, TTS system 264, user accounts system 268, and orchestrator 250 may each include instances of processor(s) 252, storage/memory 254, and communications circuitry 256, and those instances of processor(s) 252, storage/memory 254, and communications circuitry 256 within each of ASR system 258, NLU system 260, functionalities system 262, ITS system 264, user accounts system 268, and orchestrator 250 may differ. For example, the structure, functionality, and style of processor(s) 252 within ASR system 258 may be substantially similar to the structure, functionality, and style of processor(s) 252 within NLU system 260, however the actual processor(s) 252 need not be the same entity.

Figure 3:
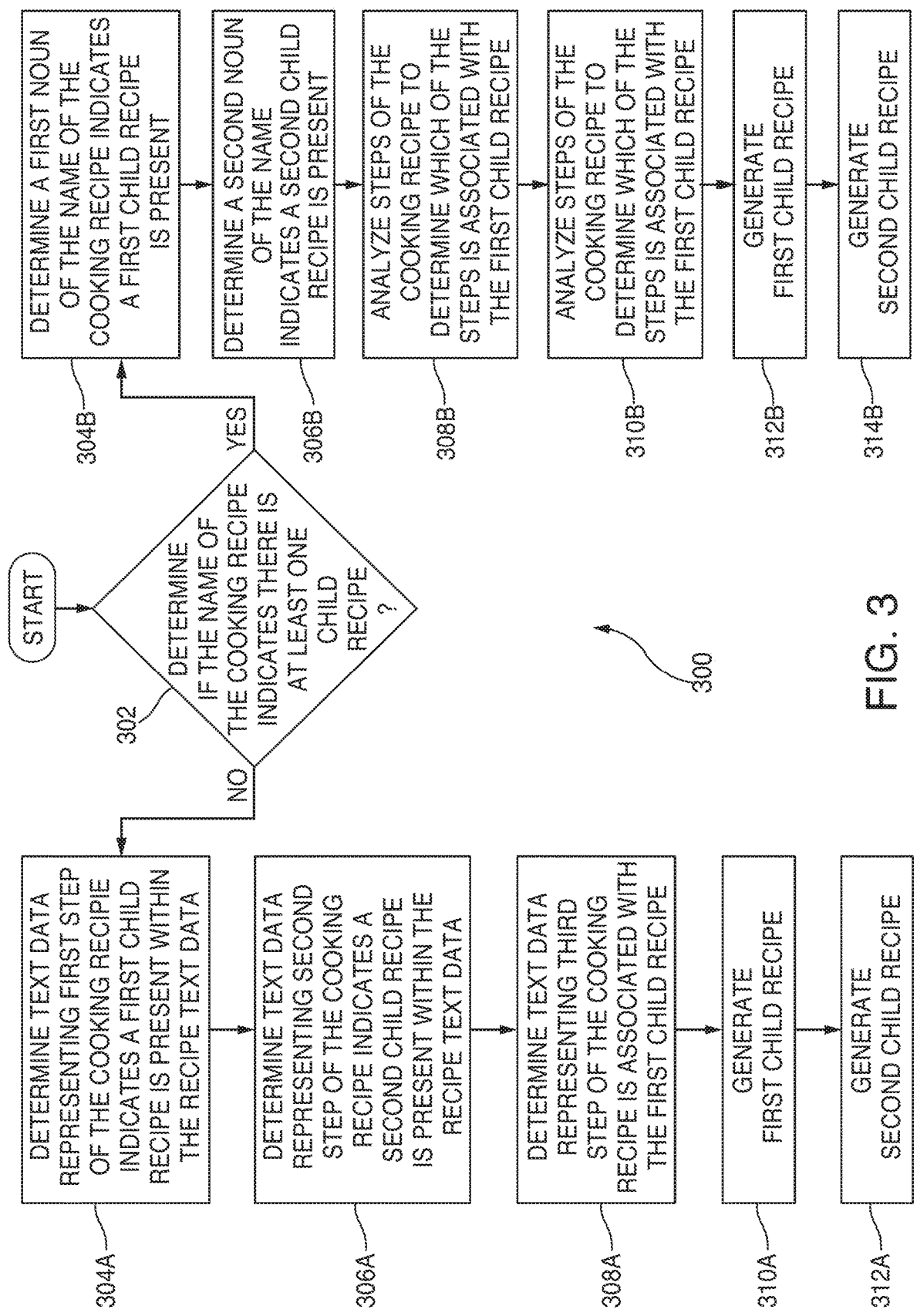
FIG. 3 is an illustrative flow diagram of a process of analyzing a cooking recipe for child recipes in accordance with various embodiments.

FIG. 3 is an illustrative flow diagram of process 300 of analyzing a cooking recipe for child recipes in accordance with various embodiments. In some embodiments, recipe text data may have child recipes flagged before a language processing system analyzes the recipe tet data to determine whether a child recipe is present within the recipe text data. Process 300, in some embodiments, may begin at step 302. At step 302, a language processing system determines if the name of the cooking recipe indicates there is at least one child recipe. Language processing system, as described herein, may be similar to language processing system 200 described above in connection with FIGS. 1A, 1B, and 2, the same description applying herein. In some embodiments, the language processing system may determine whether child recipes are present within the recipe text data by first analyzing the name of the recipe to see if the name indicates that child recipes are present. The language processing system may analyze the name and determine if there are any nouns that may represent a child recipe. For example, "pasta," "beef," "soup," "potatoes," and "fish" are all nouns that may indicate a child recipe is present within the recipe text data. This non-exhaustive list is merely exemplary. To determine whether a noun of the name of the cooking recipe that indicates a child recipe is present, the language processing system may compare the noun to stored cooking recipes. If, for example, the noun is "pasta," the language processing system may compare "pasta" to a list of stored cooking recipes. In some embodiments, the language processing system may determine that "pasta" is associated to at least one cooking recipe, and thus is likely a child recipe. As another example, the name "chicken and rice" may indicate to the language processing system that the recipe text data has two child recipes. In this example, the first child recipe may be a chicken child recipe and the second child recipe may be a rice child recipe. As noted above, making "chicken" the first child recipe and "rice" the second child recipe instead of "rice" the first child recipe and "chicken" the second child recipe may be completely arbitrary.

In some embodiments, the name of the cooking recipe may not indicate whether a child recipe is present in the cooking recipe. For example, a cooking recipe with the name "Peruvian Chicken" may not indicate whether there are any child recipes within a cooking recipe. In those embodiments, process 300 may continue at step 304A. At step 304A, the language processing system determines text data representing a first step of the cooking recipe indicates a first child recipe is present within the recipe text data. For example, if the first step of the Peruvian chicken cooking recipe is "Prepare the sauce by quartering a lime and mincing garlic," the language processing system may determine that "sauce" is a child recipe of the cooking recipe Peruvian chicken. The language processing system may break down the sentence into clauses. For example, a first clause may be "Prepare the sauce," and a second clause may be "by quartering the lime and mincing garlic." After breaking up the first step of the cooking recipe, the language processing system may determine that "sauce" is primary subject of the step of the cooking recipe, and thus a potential child recipe. In some embodiments, if a step of a cooking recipe has a primary subject that is different than the nouns within the name of the cooking recipe, the language processing system may determine that the step of the cooking recipe being analyzed is part of a child recipe. For example, the primary subject of the first step of the Peruvian chicken cooking recipe is "sauce." The sole noun in the name of the Peruvian chicken cooking recipe is "chicken." Because "sauce" is different than "chicken," the language processing system may determine that there is a sauce child recipe.

In some embodiments, the language processing system may analyze the primary subject of the cooking recipe to see if the primary subject indicates that a child recipe is present. To determine whether a primary subject of a step of a cooking recipe indicates a child recipe is present, the language processing system may compare the primary subject to stored cooking recipes. If, for example, the primary subject is "sauce," the language processing system may compare "sauce" to a list of stored cooking recipes. In some embodiments, the language processing system may determine that "sauce" is associated to at least one cooking recipe, and thus is likely a child recipe.

In some embodiments, the language processing system, may analyze the structure of a step of a cooking recipe to determine if a child recipe is present within the step. In particular, in some embodiments, words that precede certain nouns in a step of a cooking recipe may indicate a child recipe is present. For example, if a noun is preceded by the word "For," the noun may be a child recipe. Continuing the example, "For the sauce" may indicate that "the sauce" is a child recipe. As another example, if a noun is preceded by "To make." The noun may be a child recipe. Continuing the example, "To make the sauce" may indicate that "the sauce" is a child recipe." As yet another example, if a noun is preceded by the word "Prepare," the noun may be a child recipe. Continuing the example, "Prepare the sauce" may indicate that "the sauce" is a child recipe. These non-exhaustive examples are merely exemplary. Moreover, a more detailed description of how data is analyzed by the language processing system is located above in the description of language processing system, described in connection with FIG. 2 and the same description applies herein.

Process 300, in some embodiments, may continue at step 306A. At step 306A the language processing system determines text data representing a second step of the cooking recipe indicates a second child recipe is present within the recipe text data. The determination of a second child recipe in step 306A may be similar to the determination within step 304A, and the same description applies herein. In some embodiments, the language processing system determines that a noun within a second step of the cooking recipe indicates a child recipe is present. In some embodiments, the language processing system may compare the child recipe from the second step of the cooking recipe to the child recipe from the first step of the cooking recipe. For example, the second step may be "Prepare the chicken by salt and peppering both sides of the chicken." The language processing system may determine that the potential child recipe within the second step of the cooking recipe is "chicken." The language processing system may then compare "chicken" to "sauce" to determine whether there are two child recipes. In this example, the language processing system determines that "sauce" is different than "chicken" and, thus, both are their own child recipes. In some embodiments, the language processing system may determine that the potential child recipe in the second step of the cooking recipe matches the potential child recipe in the first step of the cooking recipe. In those embodiments, the language processing system may determine that both the first step of the cooking recipe and the second step of the cooking recipe are in the same child cooking recipe.

Process 300, in some embodiments, may continue at step 308A. At step 308A, the language processing system determines text data representing a third step of the cooking recipe is associated with the first child recipe. The determination of a second child recipe in step 308A may be similar to the determination within step 304A, and the same description applies herein. In some embodiments, the language processing system determines that a noun within a third step of the cooking recipe indicates a child recipe is present. In some embodiments, the third step of the cooking recipe may comprise the same noun in the primary subject of the step that the first step of the cooking recipe comprises. For example, if the first step of the cooking recipe is "Prepare the sauce by quartering a lime and mincing garlic," and the third step of the cooking recipe is "Make the sauce by mixing the lime juice and the minced garlic," the language processing system may determine that the first step of the cooking recipe and the third step of the cooking recipe are part of the same child recipe. The language processing system may make this determination by comparing the noun "sauce" from the first step of the cooking recipe to the noun "sauce" from the third step of the cooking recipe. In some embodiments, the language processing system may focus on these nouns because of the words that precede the nouns— "Prepare" and "Make."

In some embodiments, the language processing system may determine that a third step of the cooking recipe is associated with the first child recipe by comparing the third step of the cooking recipe to the first step of the cooking recipe (the already determined first step of the first child recipe). For example if the first step is "Prepare the sauce by quartering a lime and mincing garlic" and the third step is "Mix the juice from the lime wedges and the minced garlic," the language processing system may determine that the first step and the third step are associated, even though "sauce" does not appear in the first step. The language processing system may determine this by comparing all of the nouns from each step. For example, because the lime and garlic are used in both step one of the cooking recipe and step three of the cooking recipe, the language processing system may determine that both the first step of the cooking recipe and the third step of the cooking recipe are part of the same child recipe.

Process 300, in some embodiments, may continue at step 310A. At step 310A, the language processing system generates the first child recipe. Step 310A may be similar to step 158 described above in connection with FIGS. 1A and 1B and the same description applies. After determining which steps of the cooking recipe are associated with the first child recipe, the language processing system may generate the first child recipe by generating first child recipe text data, the first child recipe text data being every step of the cooking recipe identified as being associated with the first child recipe. For example, returning to the exemplary cooking recipe steps above, the language processing system may generate the following first child recipe:

"Prepare the sauce by quartering a lime and mincing garlic;" and

"Make the sauce by mixing the lime juice and the minced garlic."

In some embodiments, text data representing a first child name may be generated as well. For example, the first child recipe may have a name of "Sauce recipe." The name may allow an individual to make a request to hear step-by-step instructions for the first child recipe. For example, an individual may state "Alexa, how do I make the sauce?" In response, the language processing system may generate audio data representing the text data of the first child recipe. This audio data may be sent to an electronic device that outputs step-by-step instructions on how to make the sauce.

Process 300, in some embodiments, may continue at step 312A. At step 312A the language processing system generates the second child recipe. Step 312A may be similar to step 160 described above in connection with FIGS. 1A and 1B and the same description applies. After determining which steps of the cooking recipe are associated with the second child recipe, the language processing system may generate the second child recipe by generating second child recipe text data, the second child recipe text data being every step of the cooking recipe identified as being associated with the second child recipe. In some embodiments, text data representing a second child name may be generated as well. For example, the first child recipe may have a name of "Chicken recipe." The name may allow an individual to make a request to hear step-by-step instructions for the second child recipe. For example, an individual may state "Alexa, how do I make the chicken?" In response, the language processing system may generate audio data representing the text data of the second child recipe. This audio data may be sent to an electronic device that outputs step-by-step instructions on how to make the chicken.

In some embodiments, the name of the cooking recipe may indicate that a child recipe is present. In those embodiments, process 300 may continue at step 304B. At step 304B, the language processing system determines a first noun of the name of the cooking recipe indicates a first child recipe is present. In some embodiments, the language processing system may determine that child recipes are present within the recipe text data by first analyzing the name of the recipe to see if the name indicates that child recipes are present. For example, if the name of the cooking recipe is chicken and rice, the first noun of the name would be "chicken." The language processing system may analyze the noun "chicken" to determine if the name that may represent a child recipe. In some embodiments the language processing system may determine a noun represents a potential child recipe by comparing the noun to stored cooking recipes. Continuing the example, if the noun is "chicken," the language processing system may compare "chicken" to a list of stored cooking recipes. In some embodiments, the language processing system may determine that "chicken" has at least one cooking recipe, and thus is likely a child recipe. Step 304B may be similar to step 302 described above in connection with process 300 and the same description applies herein.

Process 300, in some embodiments, may continue at step 306B. At step 306B, the language processing system may determine a second noun of the name indicates a second child recipe is present. In some embodiments, the language processing system may determine that a second child recipe is present within the recipe text data by continuing to analyze the name of the recipe. For example, if the name of the cooking recipe is chicken and rice, the second noun of the name would be "rice." The language processing system may analyze the noun "rice" to determine if the name that may represent a child recipe. In some embodiments the language processing system may determine a noun represents a potential child recipe by comparing the noun to stored cooking recipes. Continuing the example, if the noun is "rice," the language processing system may compare "rice" to a list of stored cooking recipes. In some embodiments, the language processing system may determine that "rice" has at least one cooking recipe, and thus is likely a child recipe. In some embodiments, the language processing system may compare text data representing the noun "rice" and text data representing the noun "chicken" to determine whether the nouns are different and thus are can be two different child recipes. Step 306B may be similar to step 302 described above in connection with process 300 and the same description applies herein.

Process 300, in some embodiments, may continue at step 308B. At step 308B, the language processing system analyzes the steps of the cooking recipe to determine which of the steps is associated with the first child recipe. Continuing the example, language processing system may compare text data representing the noun "chicken" to text data representing all of the steps within the cooking recipe. All of the steps of the cooking recipe may be as follows:

"Prepare the chicken by seasoning with salt and pepper;"

"To cook the chicken, place the chicken on a medium pan for five minutes on each side;"

"To cook the rice, combine one cup of rice with one cup of water in a medium pot and heat to boiling;" and "Prepare the rice by seasoning with salt and pepper."

Continuing the example, the language processing system may compare text data representing the noun "chicken" to text data representing each of the above four steps. In some embodiments, language processing system may determine that the first and second steps are a part of the first child recipe because the noun "chicken" is present in the steps. In some embodiments, the language processing system may determine that the third and fourth steps are not part of the first child recipe because text data representing the noun "chicken" is absent from steps three and four. In some embodiments, the language processing system may analyze the sentence, similar to the description for step 302 described above in connection with process 300, the same description applying herein.

Process 300, in some embodiments, may continue at step 310B. At step 310, the language processing system analyzes the steps of the cooking recipe to determine which of the steps is associated with the second child recipe. Continuing the example, the language processing system may compare text data representing the noun "rice" to text data representing each of the above four steps. In some embodiments, language processing system may determine that the third and fourth steps are a part of the first child recipe because the noun "rice" is present in the steps. In some embodiments, the language processing system may determine that the first and second steps are not part of the first child recipe because text data representing the noun "rice" is absent from steps one and two. In some embodiments, the language processing system may analyze the sentence, similar to the description for step 302 described above in connection with process 300, the same description applying herein. In some embodiments, step 308 and step 310 happen simultaneously.

Process 300, in some embodiments, may continue at step 312B. At step 312B, the language processing system generates the first child recipe. Step 312B may be similar to step 158 described above in connection with FIGS. 1A and 1B and the same description applies. After determining which steps of the cooking recipe are associated with the first child recipe, the language processing system may generate the first child recipe by generating first child recipe text data, the first child recipe text data being every step of the cooking recipe identified as being associated with the first child recipe. For example, returning to the exemplary cooking recipe steps above, the language processing system may generate the following first child recipe:

"Prepare the chicken by seasoning with salt and pepper," and

"To cook the chicken, place the chicken on a medium pan for five minutes on each side."

In some embodiments, text data representing a first child name may be generated as well. For example, the first child recipe may have a name of "Chicken recipe." The name may allow an individual to make a request to hear step-by-step instructions for the first child recipe. For example, an individual may state "Alexa, how do I make the chicken?" In response, the language processing system may generate audio data representing the text data of the first child recipe. This audio data may be sent to an electronic device that outputs step-by-step instructions on how to make the chicken.

Process 300, in some embodiments, may continue at step 314B. At step 314B, the language processing system generates the second child recipe. Step 314B may be similar to step 160 described above in connection with FIGS. 1A and 1B and the same description applies. After determining which steps of the cooking recipe are associated with the second child recipe, the language processing system may generate the second child recipe by generating second child recipe text data, the second child recipe text data being every step of the cooking recipe identified as being associated with the second child recipe. For example, returning to the exemplary cooking recipe steps above, the language processing system may generate the following second child recipe:

"To cook the rice, combine one cup of rice with one cup of water in a medium pot and heat to boiling;" and "Prepare the rice by seasoning with salt and pepper."

In some embodiments, text data representing a second child name may be generated as well. For example, the second child recipe may have a name of "Rice recipe." The name may allow an individual to make a request to hear step-by-step instructions for the second child recipe. For example, an individual may state "Alexa, how do I make the rice?" In response, the language processing system may generate audio data representing the text data of the second child recipe. This audio data may be sent to an electronic device that outputs step-by-step instructions on how to make the rice.

In some embodiments, the steps within process 300 may be rearranged or omitted. Furthermore, the use of a cooking recipe is merely exemplary and any multi-step process may be used. For example, a multi-step process may be represented by process text data. Moreover, instead of cooking child recipes, a multi-step process may comprise nested child processes (i.e. a first child process and a second child process).

Figure 4:
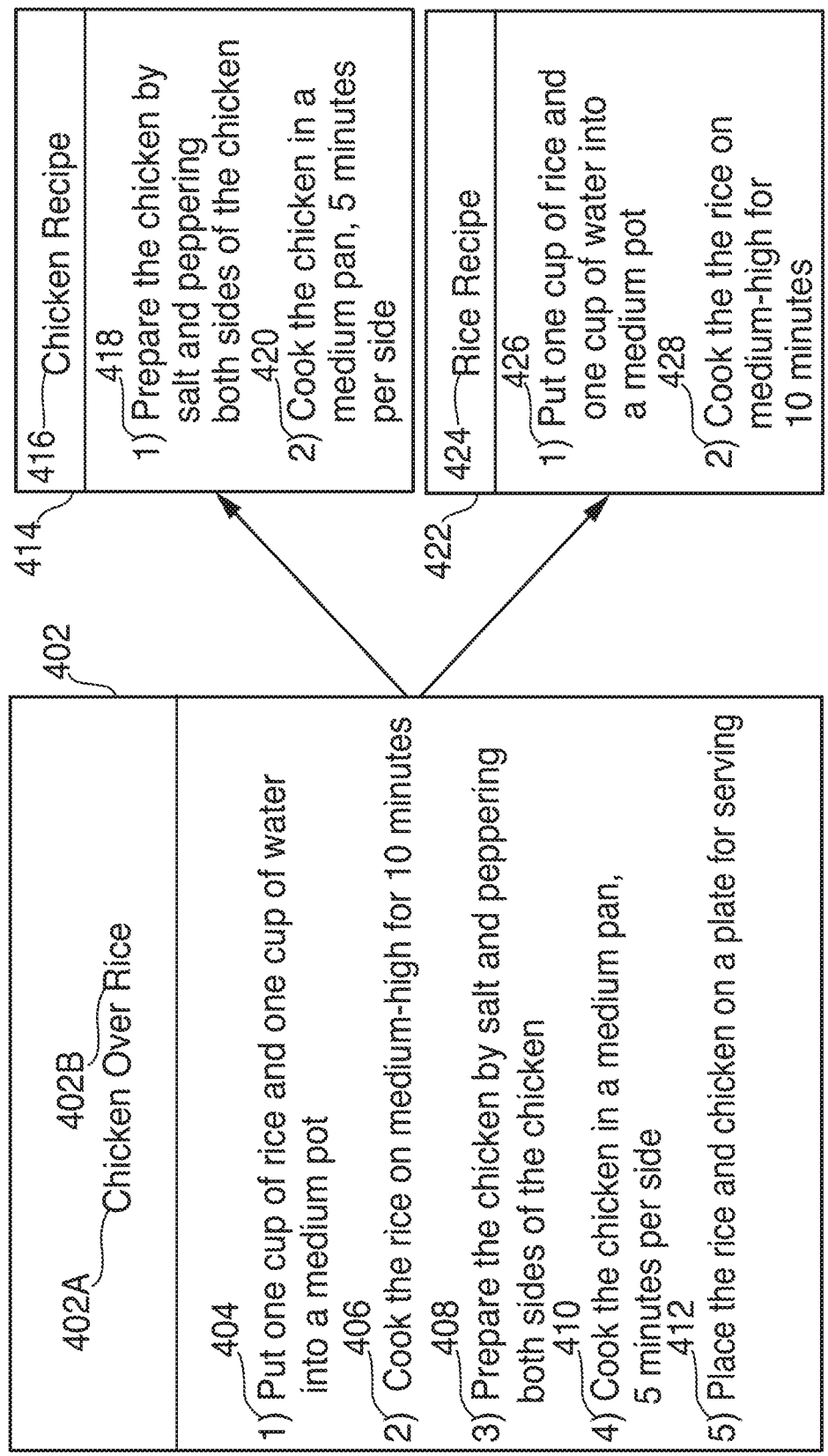
FIG. 4 is an illustrative diagram of a cooking recipe broken up into two child recipes in accordance with various embodiments.

FIG. 4 is an illustrative diagram of a cooking recipe broken up into two child recipes in accordance with various embodiments. FIG. 4 is merely an exemplary diagram that visualizes a cooking recipe where the name is used to determine two child recipes are present within the cooking recipe. As shown in FIG. 4, cooking recipe 402 has a name "Chicken Over Rice." The name of cooking recipe 402 has two nouns Chicken 402A and Rice 402B. In some embodiments, a language processing system may analyze the name of cooking recipe 402 to determine Chicken 402A represents first child recipe 414 and Rice 402B represents second child recipe 422. This analysis may be similar to the analysis described above in connection with FIGS. 1A, 1B, and 3 and the same description applies herein. The language processing system used herein may be similar to language processing system 200 described above in connection with FIGS. 1A, 1B, and 2, the same descriptions applying herein.

In some embodiments, the language processing system may analyze each step to determine whether the step is associated with first child recipe 414 or second child recipe 422. In some embodiments, the language processing system may determine that third step 408 and fourth step 410 are associated with first child recipe 414. In some embodiments, the language processing system may determine that first step 404 and second step 406 are associated with second child recipe 422. This analysis may be similar to the analysis described above in connection with FIGS. 1A, 1B, and 3 and the same description applies herein.

In some embodiments, a cooking recipe may comprise introductory or final steps that include ingredients from both child recipes. For example, fifth step 412 includes both "chicken" and "rice." The language processing system may determine that fifth step 412 should not be associated with either first child recipe 414 or second child recipe 422 because both child recipes are present within fifth step 412. In some embodiments, because "chicken" and "rice" are both present in fifth step 412, the language processing system may associate fifth step 412 with both first child recipe 414 and second child recipe 422. In those embodiments, when an individual asks to hear step-by-step instructions for either first child recipe 414 or second child recipe 422, fifth step 412 may be part of both first child recipe 414 and second child recipe 422.

As another example, an introductory step to a cooking recipe may include preparing ingredients from multiple child recipes in the cooking recipe. Because ingredients from multiple child recipes are present in one step, the language processing system may determine that the introductory step should not be included in any of the child recipes. In some embodiments, the language processing system may determine that the introductory step should be in each child recipe that is relevant. For example, if there are three child recipes and the introductory step includes ingredients from the first child recipe and the third child recipe, the language processing system may associate the introductory step with the first child recipe and the second child recipe.

After analyzing each step of cooking recipe 402, the language processing system may generate first child recipe 414 and second child recipe 422. As shown in FIG. 4, first child recipe 414 includes step one of first child recipe 418 and step two of first child recipe 420. In some embodiments, language processing system may also generate first child recipe name 416 with step one of first child recipe 418 and step two of first child recipe 420. Second child recipe 422 may include step one of second child recipe 426 and step two of second child recipe 428. In some embodiments, the language processing system may also generate second child recipe name 424 with step one of second child recipe 426 and step two of second child recipe 428.

While only two child recipes are shown in FIG. 4, the number of child recipes is merely exemplary. Any amount of child recipes may be nested within a cooking recipe.

Figure 5:
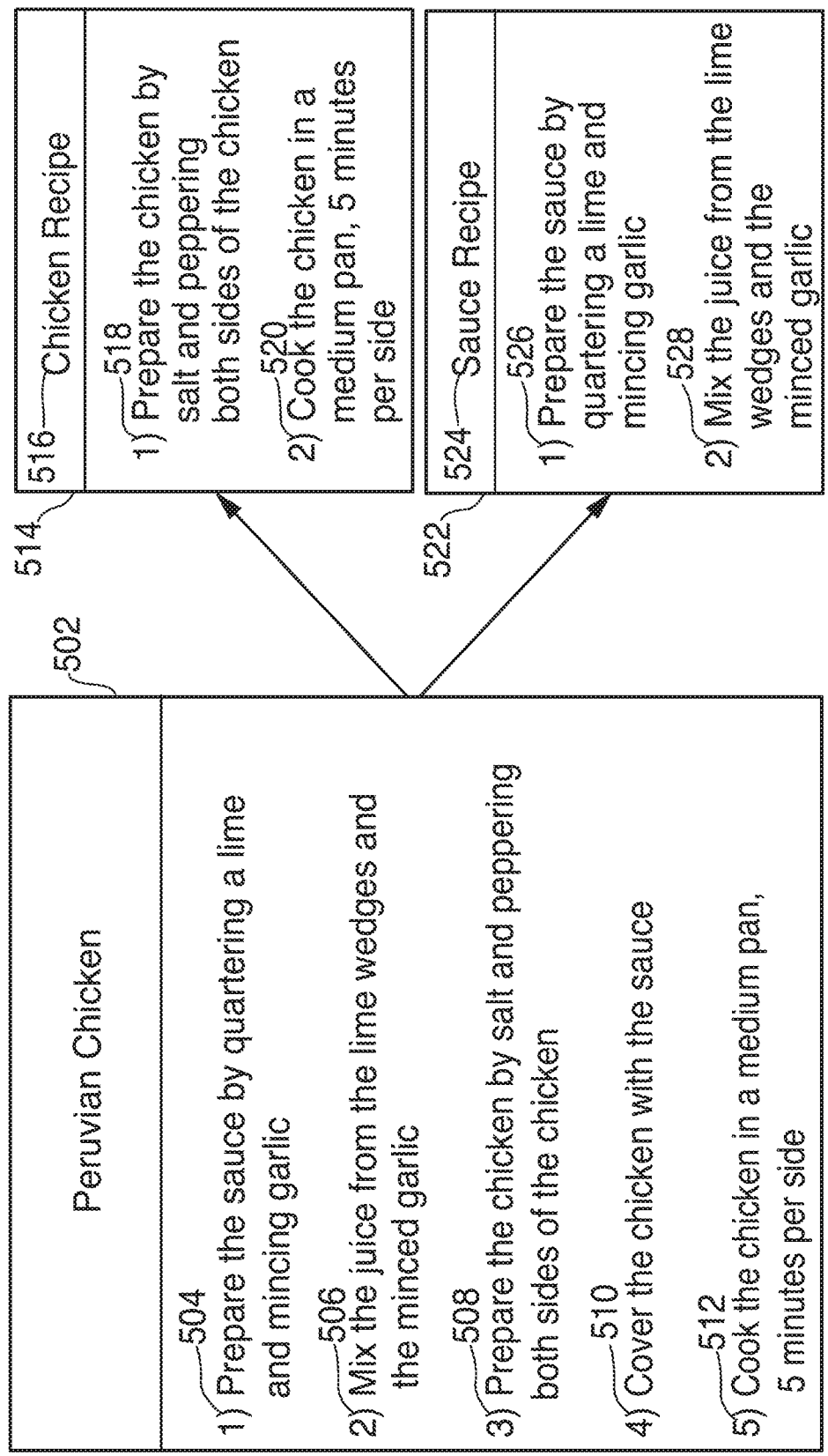
FIG. 5 is another illustrative diagram of another cooking recipe broken up into two child recipes in accordance with various embodiments.

FIG. 5 is another illustrative diagram of another cooking recipe broken up into two child recipes in accordance with various embodiments. FIG. 5 is merely an exemplary diagram that visualizes a cooking recipe where the steps of the cooking recipe are used to determine two child recipes are present within the cooking recipe. As shown in FIG. 5, cooking recipe 502 has a name "Peruvian Chicken." In some embodiments, a language processing system may analyze the name of cooking recipe 502 to determine that the name of cooking recipe does not indicate whether a child recipe is present within cooking recipe 502. In some embodiments, the language processing system may analyze each step to determine whether a child recipe is present within cooking recipe 502. This analysis may be similar to the analysis described above in connection with FIGS. 1A, 1B, and 3 and the same description applies herein. The language processing system used herein may be similar to language processing system 200 described above in connection with FIGS. 1A, 1B, and 2, the same descriptions applying herein.

In some embodiments, the language processing system may analyze each step to and determine that first step 504 and second step 506 are associated with second child recipe 522. In some embodiments, the language processing system may determine that third step 508 and fifth step 512 are associated with first child recipe 514. This analysis may be similar to the analysis described above in connection with FIGS. 1A, 1B, and 3 and the same description applies herein.

In some embodiments, a cooking recipe may comprise steps that include ingredients from both child recipes. For example, fourth step 510 includes both "sauce" and "chicken." The language processing system may determine that fourth step 510 should not be associated with either first child recipe 514 or second child recipe 522 because both child recipes are present within fourth step 510. In some embodiments, because "sauce" and "chicken" are both present in fourth step 510, the language processing system may associate fourth step 510 with both first child recipe 414 and second child recipe 522. In those embodiments, when an individual asks to hear step-by-step instructions for either first child recipe 514 or second child recipe 522, fourth step 510 may be part of both first child recipe 514 and second child recipe 522.

In some embodiments, second child recipe 522 must be finished before an individual can complete first child recipe 514. In those embodiments, the language processing system may generate text data representing a notification that second child recipe 522 must be finished before first child recipe 514 can be completed. For example, if an individual has requested step-by-step instructions for first child recipe 514, the language processing system may generate text data representing "Finishing the sauce is required before the chicken can be cooked. Would you like to hear how to cook the sauce?" After generating the text data, in some embodiments, the language processing system may generate audio data based on the text data by executing text-to-speech functionality on the text data. In some embodiments, the language processing system may also generate instructions to be output with the audio data representing the notification. The instructions may cause a voice-controlled electronic device to listen for a response after outputting the audio data representing the notification.

After analyzing each step of cooking recipe 502, the language processing system may generate first child recipe 514 and second child recipe 522. As shown in FIG. 5, first child recipe 514 includes step one of first child recipe 518 and step two of first child recipe 520. In some embodiments, language processing system may also generate first child recipe name 516 with step one of first child recipe 518 and step two of first child recipe 520. Second child recipe 522 may include step one of second child recipe 526 and step two of second child recipe 528. In some embodiments, the language processing system may also generate second child recipe name 524 with step one of second child recipe 426 and step two of second child recipe 528.

While only two child recipes are shown in FIG. 5, the number of child recipes is merely exemplary. Any amount of child recipes may be nested within a cooking recipe.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method, comprising:
receiving, from a voice-controlled electronic device, first audio data representing a request for a cooking recipe;
processing the first audio data to determine a recipe name;
determining recipe text data corresponding to the recipe name, the recipe text data representing a plurality of cooking steps corresponding to the recipe name;
determining that a first portion of the recipe text data corresponds to a first step of the plurality of cooking steps;
processing the first portion, using natural language understanding (NLU), to determine that the first step corresponds to a first recipe for a first item associated with the recipe name;
determining that a second portion of the recipe text data corresponds to a second step of the plurality of cooking steps;
processing the second portion, using NLU, to determine that the second step corresponds to a second recipe for a second item associated with the recipe name;
determining that a third portion of the recipe text data corresponds to a third step of the plurality of cooking steps;
processing the third portion, using NLU, to determine that the third step corresponds to the first item;
generating first recipe data using at least the first portion and the third portion;
generating second recipe data using at least the second portion;
generating, using text-to-speech (TTS) processing on the first recipe data, second audio data representing at least the first step;
sending the second audio data to the voice-controlled electronic device causing the voice-controlled electronic device to output the second audio data;
generating third audio data representing a prompt that inquires whether the second recipe should begin;
sending, to the voice-controlled electronic device, the third audio data causing the voice-controlled electronic device to output the prompt;
sending, to the voice-controlled electronic device, a listening instruction that causes the voice-controlled electronic device to listen for a response to the prompt;
receiving fourth audio data representing a response to the prompt indicating the second recipe should begin;
generating, using TTS processing on the second recipe data, fifth audio data representing at least the second step; and
sending the fifth audio data to the voice-controlled electronic device causing the voice-controlled electronic device to output the fifth audio data.

2. The method of claim 1, further comprising:
determining that the first step comprises a waiting time period;
determining that a third step can be presented during the waiting time period;
generating, using TTS processing on the first recipe data, sixth audio data representing the third step; and
sending the sixth audio data to the voice-controlled electronic device causing the voice-controlled electronic device to output the sixth audio data.

3. The method of claim 1, further comprising:
determining that the second step is to be completed before a third step corresponding to the second recipe; and
sending the fifth audio data to the voice-controlled electronic device causing the voice-controlled electronic device to output the fifth audio data before sixth audio data corresponding to the third step.

4. A method, comprising:
receiving input text data representing a request for a cooking recipe;
processing the input text data using natural language understanding (NLU) to determine a first recipe;
determining a plurality of steps corresponding to the first recipe;
determining that the first recipe includes a second recipe and a third recipe, the second recipe being separate from the third recipe;
determining that a first step of the plurality of steps corresponds to the second recipe;
determining that a second step of the plurality of steps corresponds to the third recipe;
generating, using at least the first step, first recipe text data corresponding to the second recipe;
applying text-to-speech (TTS) processing to the first recipe text data to generate first output audio data;
sending the first output audio data to a device causing the device to output the first output audio data;
generating second output audio data representing a prompt that inquires whether the third recipe should begin;
sending, to the device, the second output audio data causing the device to output the prompt;
sending, to the device, a listening instruction that causes the device to receive input audio representing a response to the prompt;
processing the input audio to determine that the response to the prompt indicates the third recipe should begin;
generating, using at least the second step, second recipe text data corresponding to the third recipe;
applying TTS processing to the second recipe text data to generate third output audio data; and
sending the third output audio data to the device causing the device to output the third output audio data.

5. The method of claim 4, further comprising:
determining text data corresponding to the plurality of steps;

determining, using NLU, that a first portion of the text data representing the first step includes a first item that indicates the first recipe includes the second recipe; and determining, using NLU, that a second portion of the text data representing the second step includes a second item that indicates the first recipe includes the third recipe.

6. The method of claim 4, further comprising:

generating second recipe text data corresponding to the third recipe using the second step;

applying TTS processing to the second recipe text data representing at least the second step to generate fourth output audio data;

determining that the second step is to be completed before a third step corresponding to the second recipe; and sending the fourth output audio data to the device causing the device to output the fourth output audio data before fourth output audio data corresponding to the third step.

7. The method of claim 4, wherein determining that the first recipe includes the second recipe and the third recipe, comprises:

determining recipe name text data corresponding to the first recipe;

determining that the recipe name text data includes a first word indicating a first food item; and determining that the recipe name text data includes a second word indicating a second food item, wherein determining that the first step corresponds to the second recipe comprises determining that third text data representing the first step includes the first word, and wherein determining that the second step corresponds to the third recipe comprises determining that fourth text data representing the second step includes the second word.

8. The method of claim 4, further comprising:

determining that the first step is associated with a waiting time period;

determining that a third step of the plurality of steps is to be presented during the waiting time period;

generating third recipe text data using the third step;

applying TTS processing to the third recipe text data to generate fourth output audio data; and sending the fourth output audio data to the device causing the device to output the fourth output audio data during the waiting time period.

9. The method of claim 4, further comprising:

receiving input audio data from the device, the input audio data representing an utterance;

processing the input audio data to determine second input text data;

determining, using NLU, that the second input text data is a request for the third recipe;

generating second recipe text data corresponding to the third recipe using at least the second step;

applying TTS processing to the second recipe text data representing at least the second step to generate fourth output audio data; and sending the fourth output audio data to the device causing the device to output the fourth output audio data.

10. A system comprising:

at least one processor; and at least one memory including instructions that, when executed by the at least one processor, cause the system to:

receive input text data representing a request for a cooking recipe;

process the input text data using natural language understanding (NLU) to determine a first recipe;

determine a plurality of steps corresponding to the first recipe;

determine that the first recipe includes a second recipe and a third recipe, the second recipe being separate from the third recipe;

determine that a first step of the plurality of steps corresponds to the second recipe;

determine that a second step of the plurality of steps corresponds to the third recipe;

generate, using at least the first step, first recipe text data corresponding to the second recipe;

applying text-to-speech (TTS) processing to the first recipe text data to generate first output audio data;

send the first output audio data causing a device to output the first output audio data;

generate second output audio data representing a prompt that inquires whether the third recipe should begin;

send, to the device, the second output audio data causing the device to output the prompt;

send, to the device, a listening instruction that causes the device to receive input audio representing a response to the prompt:

process the input audio to determine that the response to the prompt indicates the third recipe should begin;

generate, using at least the second step, second recipe text data corresponding to the third recipe;

apply TTS processing to the second recipe text data to generate third output audio data; and send the third output audio data to the device causing the device to output the third output audio data.

11. The system of claim 10, wherein the at least one memory further comprises instructions that, when executed by the at least one processor, further cause the system to:

determine text data corresponding to the plurality of steps:

determine, using NLU, that a first portion of the text data representing the first step includes a first item that indicates the first recipe includes the second recipe; and determine, using NLU, that a second portion of the text data representing the second step includes a second item that indicates the first recipe includes the third recipe.

12. The system of claim 10, wherein the at least one memory further comprises instructions that, when executed by the at least one processor, further cause the system to:

generate second recipe text data corresponding to the third recipe using at least the second step;

apply TTS processing to the second recipe text data representing at least the second step to generate fourth output audio data;

determine that the second step is to be completed before a third step corresponding to the second recipe; and send the fourth output audio data to the device causing the device to output the fourth output audio data before fifth output audio data corresponding to the third step.

13. The system of claim 10, wherein the at least one memory further comprises instructions that, when executed by the at least one processor, further cause the system to:

determine recipe name text data corresponding to the first recipe;

determine that the recipe name text data includes a first word indicating a first food item;

determine that the recipe name text data includes a second word indicating a second food item;

determine that third text data representing the first step includes the first word; and determine that fourth text data representing the second step includes the second word.

14. The system of claim 10, wherein the at least one memory further comprises instructions that, when executed by the at least one processor, further cause the system to:

determine that the first step is associated with a waiting time period;

determine that a third step of the plurality of steps is to be presented during the waiting time period;

generate third recipe text data using third step;

apply TTS processing to the third recipe text data to generate fourth output audio data; and send the fourth output audio data to the device causing the device to output the fourth output audio data during the waiting time period.

15. The system of claim 10, wherein the at least one memory further comprises instructions that, when executed by the at least one processor, further cause the system to:

receive input audio data from the device, the input audio data representing an utterance;

process the input audio data to determine second input text data;

determine, using NLU, that the second input text data is a request for the third recipe;

generate second recipe text data corresponding to the third recipe using at least the second step;

apply TTS processing to the second recipe text data representing at least the second step to generate fourth output audio data; and send the fourth output audio data to the device causing the device to output the fourth output audio data.

16. The system of claim 10, wherein the at least one memory further comprises instructions that, when executed by the at least one processor, further cause the system to:

generate second recipe text data corresponding to the third recipe using the second step;

apply TTS processing to the second recipe text data representing at least the second step to generate second output audio data;

determine that the second step is to be completed before a third step corresponding to the second recipe; and send the second output audio data to the device causing the device to output the second output audio data before third output audio data corresponding to the third step.

* * * * *